(12) United States Patent
Li

(10) Patent No.: US 11,677,260 B2
(45) Date of Patent: Jun. 13, 2023

(54) MANAGING POWER IN A PORTABLE DEVICE COMPRISING MULTIPLE BATTERIES

(71) Applicant: O2Micro, Inc., Santa Clara, CA (US)

(72) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 728 days.

(21) Appl. No.: 16/597,306

(22) Filed: Oct. 9, 2019

(65) Prior Publication Data

US 2020/0127467 A1 Apr. 23, 2020

Related U.S. Application Data

(60) Provisional application No. 62/748,904, filed on Oct. 22, 2018.

(51) Int. Cl.
*H02J 7/36* (2006.01)
*H02J 7/00* (2006.01)

(52) U.S. Cl.
CPC .............. *H02J 7/36* (2013.01); *H02J 7/0013* (2013.01)

(58) Field of Classification Search
None
See application file for complete search history.

(56) References Cited

U.S. PATENT DOCUMENTS 6,850,039 B2 2/2005 Popescu
10,553,915 B1 2/2020 Li (Continued)

FOREIGN PATENT DOCUMENTS

CN 1543035 A 11/2004
CN 102405576 A 4/2012

(Continued)

OTHER PUBLICATIONS

"Control Strategy Design of Dual Lithium Battery-capacitor Hybrid Energy Storage System," written by Li Junhui etc., and published in "High Voltage Engineering," vol. 41, No. 10: 3224-3232, on Oct. 31, 2015. English language abstract is enclosed.

(Continued)

*Primary Examiner* — Drew A Dunn
*Assistant Examiner* — Tynese V Mcdaniel

(57) ABSTRACT

In a portable device, a first battery has a positive terminal coupled to, through a first switch, an interface used to receive input power, and a negative terminal coupled to a reference terminal. A second battery has a positive terminal coupled to the interface, and a negative terminal coupled to the reference terminal through a second switch, and to the first battery's positive terminal through a third switch. A control circuitry controls the switches such that the device has multiple operation modes including at least a one-battery charging mode and a two-battery-in-series charging mode. In the one-battery charging mode, the circuitry turns off the third switch, and controls the other switches such that one battery is charged by the input power. In the two-battery-in-series charging mode, the control circuitry turns on the third switch and turns off the other switches, such that two batteries are charged by the input power.

20 Claims, 13 Drawing Sheets

(56) References Cited

U.S. PATENT DOCUMENTS

| | | | |
|---|---|---|---|
| 2004/0113585 A1* | 6/2004 | Stanesti | H02J 7/02 |
| | | | 320/116 |
| 2004/0178766 A1* | 9/2004 | Bucur | H02J 5/00 |
| | | | 320/112 |
| 2006/0092583 A1* | 5/2006 | Alahmad | H02J 7/0024 |
| | | | 361/15 |
| 2007/0052295 A1 | 3/2007 | Frucht | |
| 2008/0106234 A1* | 5/2008 | Yun | H02J 7/0003 |
| | | | 320/124 |
| 2008/0238203 A1* | 10/2008 | Kotikalapoodi | H02J 7/0068 |
| | | | 307/66 |
| 2009/0085553 A1 | 4/2009 | Kumar et al. | |
| 2011/0095729 A1* | 4/2011 | Tsuji | H02J 7/0068 |
| | | | 320/162 |
| 2011/0291611 A1 | 12/2011 | Manor | |
| 2013/0176001 A1* | 7/2013 | Hofmann | H01M 10/441 |
| | | | 320/162 |
| 2015/0263390 A1 | 9/2015 | Gagneur et al. | |
| 2015/0311720 A1* | 10/2015 | Zhao | H02J 7/022 |
| | | | 307/43 |
| 2016/0036251 A1 | 2/2016 | Ma | |
| 2018/0069428 A1* | 3/2018 | Hsieh | H02J 7/36 |
| 2018/0170205 A1* | 6/2018 | Yoon | H02J 7/0021 |
| 2018/0309172 A1* | 10/2018 | Ito | H02J 7/00 |

FOREIGN PATENT DOCUMENTS

| | | |
|---|---|---|
| CN | 107276156 A | 10/2017 |
| CN | 108116350 A | 6/2018 |
| CN | 207530551 U | 6/2018 |
| CN | 108429301 A | 8/2018 |
| CN | 108649658 A | 10/2018 |
| WO | 2012123815 A1 | 9/2012 |

OTHER PUBLICATIONS

"A Novel Battery Charger / Discharger Stage For Uninterruptible Power Supply System," written by J. Villegas, etc., and published in "2004 35th Annual IEEE Power Electronics Specialists Conference," pp. 1896-1901, in the year of 2004.

* cited by examiner

MANAGING POWER IN A PORTABLE DEVICE COMPRISING MULTIPLE BATTERIES

RELATED APPLICATION

This application claims priority to the U.S. Provisional Application with Ser. No. 62/748,904, filed on Oct. 22, 2018, which is hereby incorporated by reference in its entirety.

BACKGROUND

Portable devices such as smartphones and tablet PCs (personal computers) use bigger and bigger screens with more and more powerful central processing units (CPUs) and graphics processing units (GPUs), and therefore they require greater battery capacity for longer running times. Fast charging of batteries is also very important to users.

A conventional approach for increasing battery capacity is to increase the size of a battery cell. However, this approach may increase the size, e.g., the thickness, of the portable device, and limits how circuits and components can be arranged inside the portable device.

FIG. 1 illustrates a circuit diagram of another conventional approach for increasing battery capacity for a portable device 100. As shown in FIG. 1, two battery cells Cell1 and Cell2 are coupled in series. Compared with the other conventional approach mentioned above, the circuits' and components' arrangement in the portable device 100 is more flexible, and the size of the portable device 100 can therefore be smaller. To improve a user's experience, a fast-charge technology is implemented in the portable device 100 to shorten the charging time without causing too much temperature increase.

The mainstream approach for fast-charging uses a DFC (direct fast charge) topology, e.g., a high current charging path is used to charge the battery pack without switching buck/boost regulation to reduce the switching charger efficiency loss, which helps minimize the temperature increase during the fast-charge stage. As shown in FIG. 1, the high current charging path includes a charging switch Q3A and a discharging switch Q3B. A large charging current from an adapter 102 can flow through the switches Q3A and Q3B to directly charge the battery cells Cell1 and Cell2. The adapter 102 can be a higher-output-power adapter and can be connected to the portable device 100 via a Type-C cable and connector, which offers a higher current (up to 5 A), smaller connector conduction resistance (30~80 mΩ), and higher voltage (up to 20V) tolerance.

The portable device 100 is compatible with not only the higher-output-power adapter 102 but also with a typical 5V-based Type-C or Universal Serial Bus (USB) adapter. If a typical 5V-based Type-C or USB adapter is used to charge the device 100, then the device 100 enables a buck-boost switching charger 112 to perform the boost function to convert the 5V input to a higher voltage output to charge the battery cells Cell1 and Cell2. The buck-boost switching charger 112 also controls the charging current to be relatively small to reduce the device-side temperature increase caused by the buck/boost charging efficiency loss. Thus, the charging process is relatively slow. In addition, the buck-boost switching charger 112 is relatively expensive, which increases the cost of the portable device 100.

Additionally, the portable device 100 includes a power management integrated circuit (PMIC) 106 that provides regulated power to system loads/modules such as memory, a baseband module, an application processor, a camera module, a panel module, etc. The PMIC 106 is compatible with one-cell applications to achieve better cost structure. In other words, the PMIC 106 has an operating input voltage compatible with one-cell battery voltage, and can be powered by one battery cell. Thus, the portable device 100 further includes a buck converter 108, e.g., a switched capacitor buck converter. The buck converter 108 converts a two-cell battery voltage to a one-cell battery voltage to power the PMIC 106. The switched capacitor buck converter 108 increases the size of the portable device 100 and also increases power consumption.

SUMMARY

In embodiments, a portable device includes a connection interface, a first battery, a second battery, and switch control circuitry. The connection interface connects the portable device to a power source to receive input power. The first battery has a positive terminal coupled to the connection interface through a first switch, and has a negative terminal coupled to a reference terminal. The second battery has a positive terminal coupled to the connection interface, and has a negative terminal coupled to the reference terminal through a second switch and coupled to the positive terminal of the first battery through a third switch. The switch control circuitry is coupled to the first, second and third switches, and configured to control the first, second and third switches such that the portable device selectively operates in a mode of a set of modes including at least a one-battery charging mode and a two-battery-in-series charging mode. In the one-battery charging mode, the switch control circuitry turns off the third switch, and controls the first and second switches such that a battery of the first and second batteries is charged by the input power. In the two-battery-in-series charging mode, the switch control circuitry turns off the first and second switches, and turns on the third switch such that the first and second batteries are charged by the input power.

BRIEF DESCRIPTION OF THE DRAWINGS

Features and advantages of embodiments of the claimed subject matter will become apparent as the following detailed description proceeds, and upon reference to the following drawings, wherein like numerals depict like parts.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
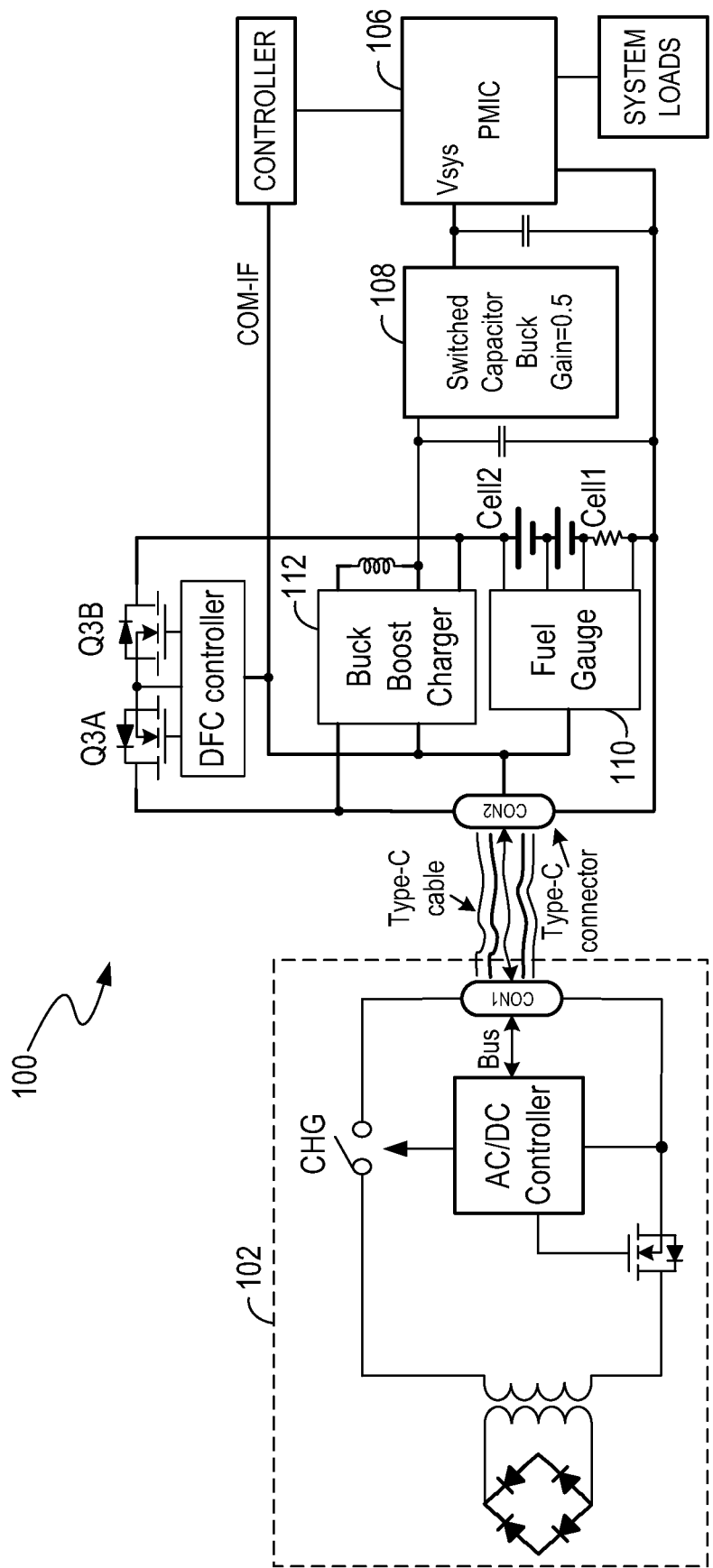
FIG. 1 illustrates a conventional arrangement of batteries for a portable device.
Figure 2:
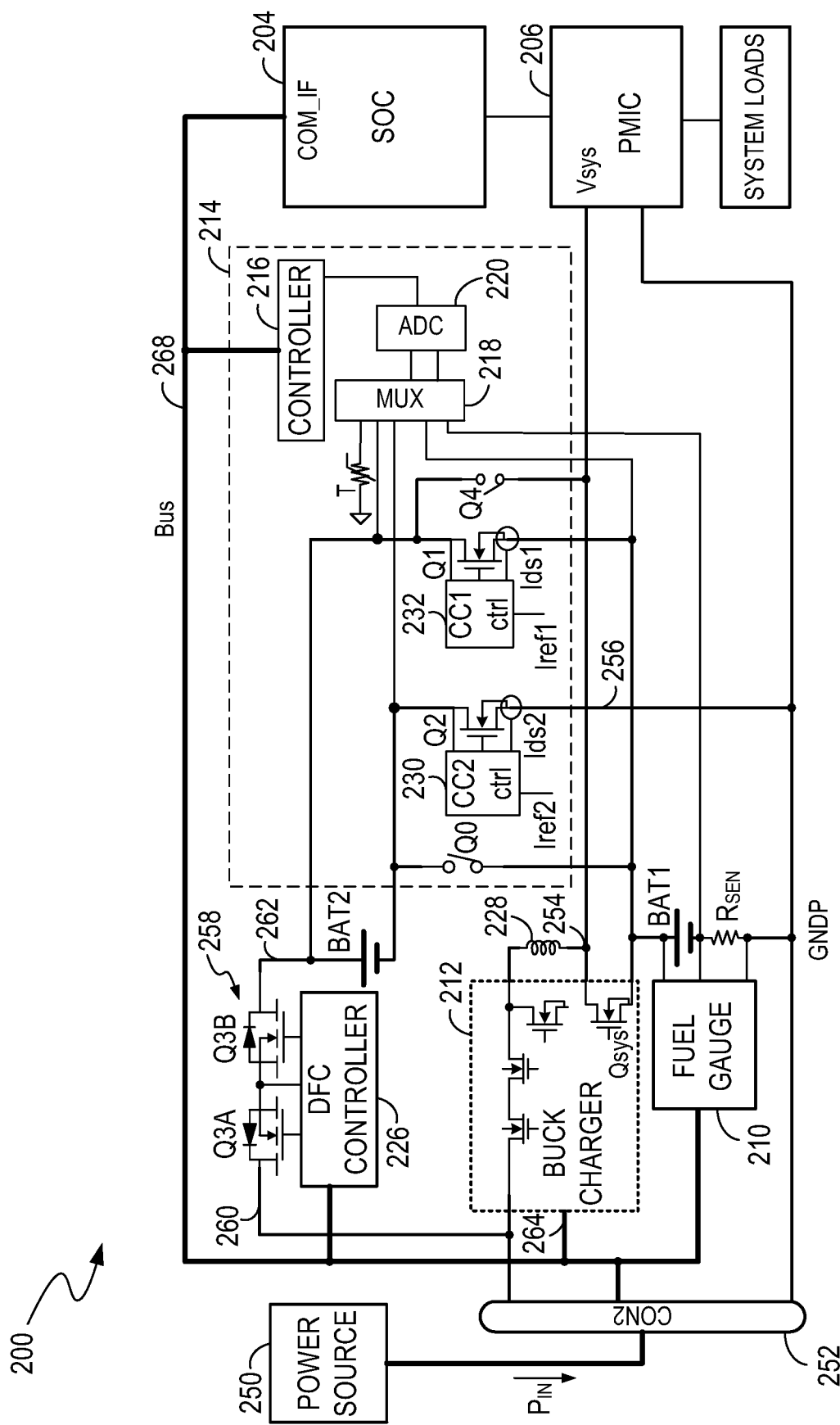
FIG. 2 illustrates an example of an arrangement of batteries for a portable device, in an embodiment of the present invention.

FIG. 2 illustrates a circuit diagram of an example of a solution for a portable device 200 with a high power requirement, in an embodiment of the present invention. The portable device 200 can be, but is not limited to, a smart phone, a tablet computer, etc. In an embodiment, the portable device 200 includes rechargeable batteries BAT1 and BAT2, e.g., Lithium-ion batteries. The batteries BAT1 AND BAT2 can be coupled in series or in parallel. In the example of FIG. 2, the battery BAT1 (which may be referred as a first battery) includes one battery cell, and the battery BAT2 (which may be referred to as a second battery) includes one battery cell. However, the invention is not so limited. In other embodiments, the battery BAT1 can be a battery unit that includes one or more battery cells, and the battery BAT2 can be a battery unit that includes one or more battery cells. In an embodiment, the battery BAT2 can be configured as a smart power-bank (SPB) and work on demand to meet various requirements in different application scenarios.

In an embodiment, multiple switch circuits are included in the portable device 200 to manage the batteries' configuration to meet different requirements. As shown in FIG. 2, the switch circuits can include a first switch Q1, a second switch Q2, and a third switch Q0. The switch circuits can also, but not necessarily, include a fourth switch Q4. These switches can be controlled by a controller 216 in battery management circuitry 214. Additionally, multiple channels ADC (analog-to-digital converter) circuitry (e.g., including a multiplexer 218 and an ADC 220) for individual voltage measurement of the batteries BAT1 and BAT2 is also included in the portable device 200 so that a system controller 204, such as an application processor or a host, can get each battery's voltage information. In an embodiment, the switch Q0 can be placed as a discrete power MOSFET (metal oxide semiconductor field effect transistor) pair. More specifically, the switch Q0 can include a pair of power MOSFETs (e.g., the switches Q0A and Q0B shown in FIG. 4) having body diodes coupled reversely to each other. Thus, no leakage current can flow through the switch Q0 when the switch Q0 is turned off, e.g., both the MOSFETs are turned off. Similarly, in an embodiment, the switch Q4 can include a pair of power MOSFETs having body diodes coupled reversely. In an embodiment, the system controller 204 can control a driver (not shown in FIG. 2) to control the switch Q0. In an embodiment, the switch Q4 can be controlled by a smart power bank (SPB) manager (not shown in FIG. 2). The smart power bank manager can be under control of the system controller 204. In an embodiment, the system controller 204 includes an SOC (system on a chip) configured to control the abovementioned driver of the switch Q0, and to control the smart power bank manager.

In an embodiment, the portable device 200 is compatible with multiple types of power source 250, e.g., including a higher-output-power adapter (e.g., 20V/5 A) and a lower-output-power adapter (e.g., 5V/2 A). More specifically, the higher-output-power adapter is capable of providing an output voltage, at a relatively high voltage level, to charge multiple batteries (e.g., including the batteries BAT1 and BAT2 shown in FIG. 2) coupled in series. For example, the higher-output-power adapter can be a PPS (USB PD 3.0 Programmable Power Supply) capable power adapter. The lower-output-power adapter is capable of providing an output voltage (e.g., 4.9V, 5V, 5.1, 5.2V, or the like) to charge one battery or to charge multiple batteries coupled in parallel. For example, the lower-output-power adapter can be a typical 5V-based Type-C or USB adapter. If a higher-output-power adapter is used to charge the portable device 200, then a DFC (direct fast charge) controller 226 enables a fast charging path 258 (e.g., including a charging switch Q3A and a discharging switch Q3B) to deliver power from the adapter to charge the batteries BAT1 and BAT2. If a lower-output-power adapter is used to charge the portable device 200, then a charger circuit 212, e.g., including a buck charger, is enabled to convert the power from the adapter to regulated power to charge the battery BAT1 and/or the battery BAT2. In an embodiment, the charger circuit 212 includes a set of switches coupled to an inductive component 228, e.g., an inductor. The switches cooperate with the inductive component 228 to convert input power $P_{IN}$ received at a connection interface 252 (e.g., a Type-C or USB interface) to regulated power, e.g., a regulated voltage or a regulated current, at an output terminal 254 of the charger circuit 212. In an embodiment, the connection node between the inductor 228 and the switch Qsys is referred to as an output terminal 254 of the charger circuit 212.

In an embodiment, by controlling the abovementioned switch circuits (e.g., including the switches Q0, Q1, Q2 and Q4), the portable device 200 can operate in different charging and discharging modes to meet different situations/requirements. Additionally, because of the switch circuits, the buck-boost switching charger 112 in the conventional portable device 100 can be replaced by a simple buck switching charger 212 in the portable device 200, which reduces cost and power consumption. The buck converter 108 in the conventional portable device 100 can also be omitted in the portable device 200. In some embodiments, the abovementioned charging and discharging modes include, but are not limited to, a 2S1P charging mode, a 1S1P charging mode, a 1S2P charging mode, a 1S1P discharging mode, a 1S2P discharging mode, and a 2S1P discharging mode. As used herein, "2S1P" represents two series one parallel, and it means two batteries coupled in series in one current path; "1S1P" represents one series one parallel, and it means one battery in one current path; and "1S2P" represents one series two parallel, and it means that two current paths are coupled in parallel, and each of the current paths includes one battery. Examples of the charging and discharging modes are presented as follows.

Figure 7A:
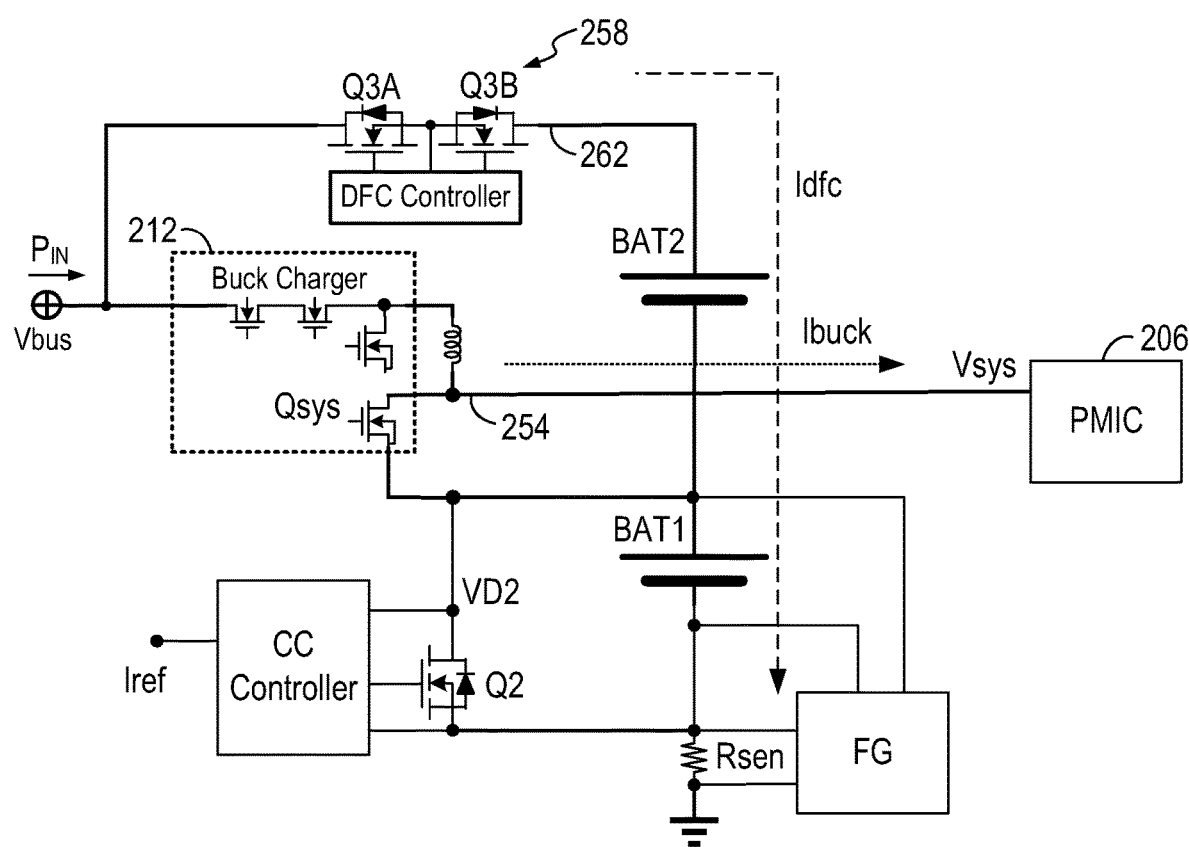
FIG. 7A illustrates examples of currents in a portable device, in an embodiment of the present invention.
Figure 7B:
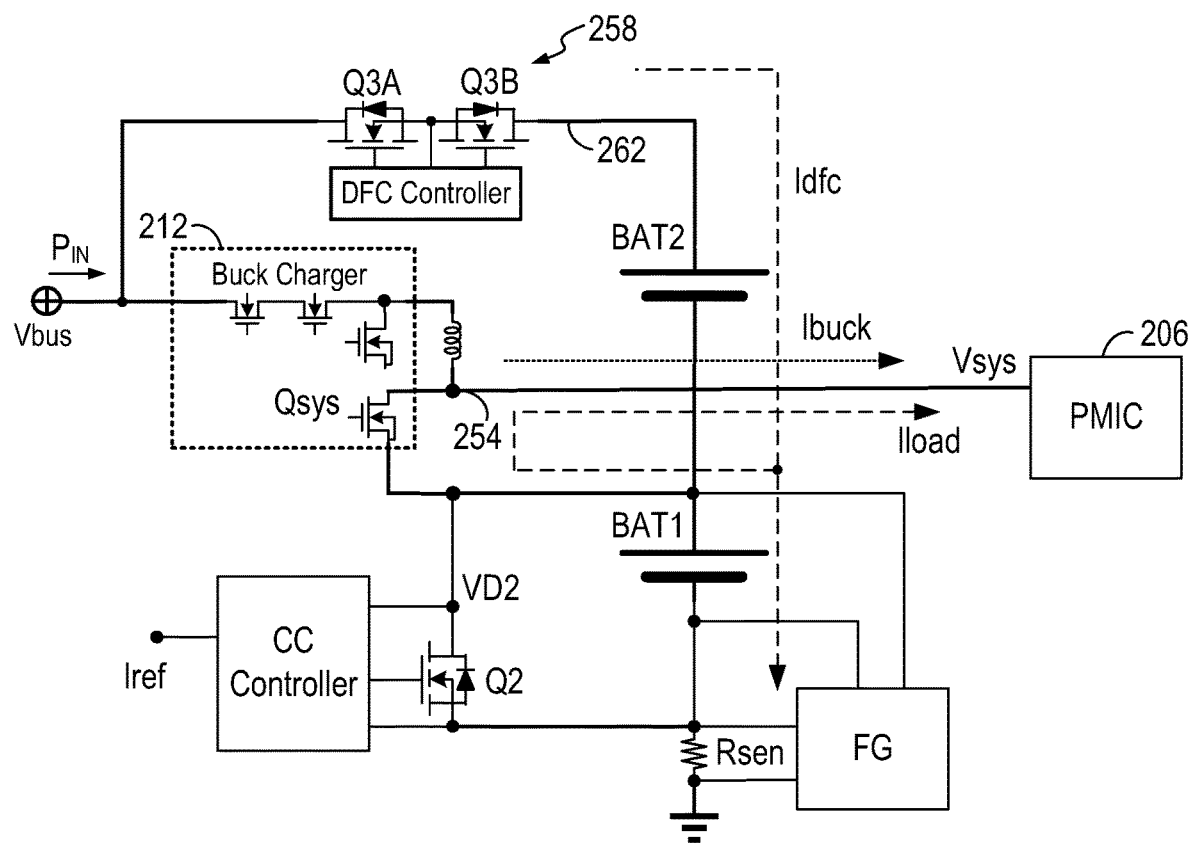
FIG. 7B illustrates examples of currents in a portable device, in an embodiment of the present invention.
Figure 7C:
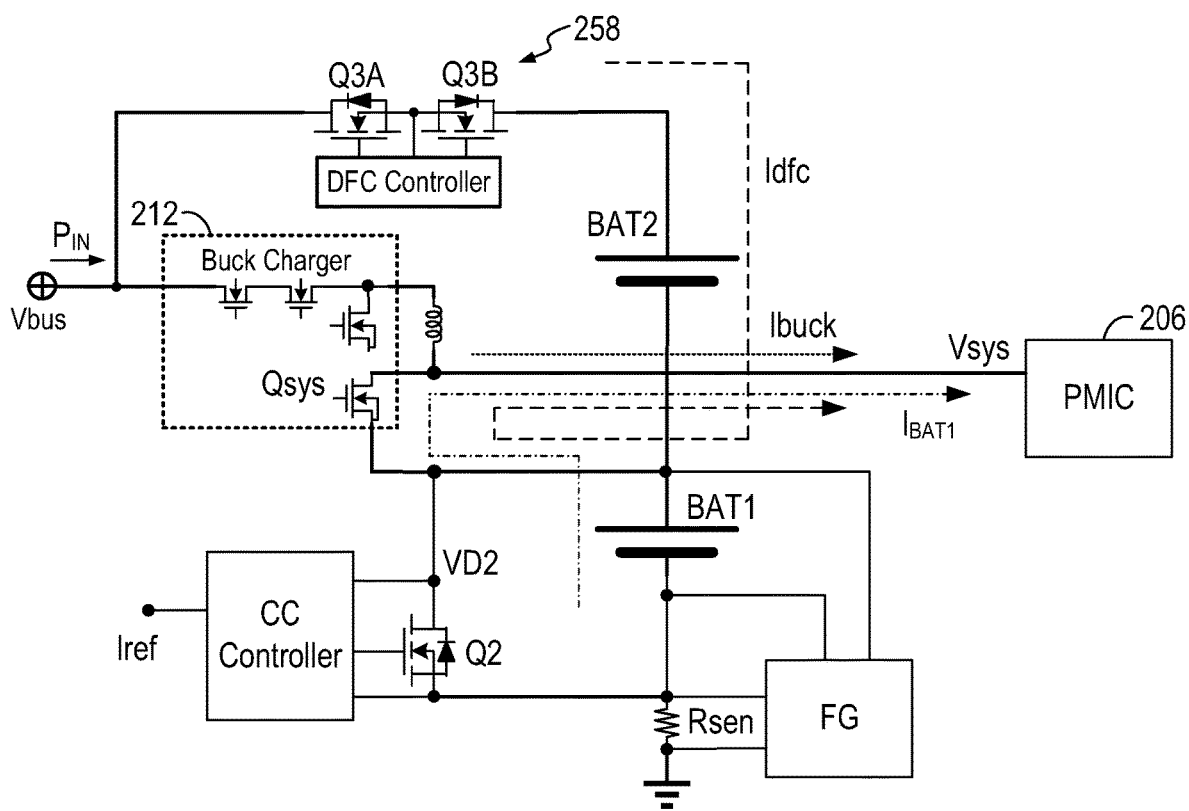
FIG. 7C illustrates examples of currents in a portable device, in an embodiment of the present invention.
Figure 7D:
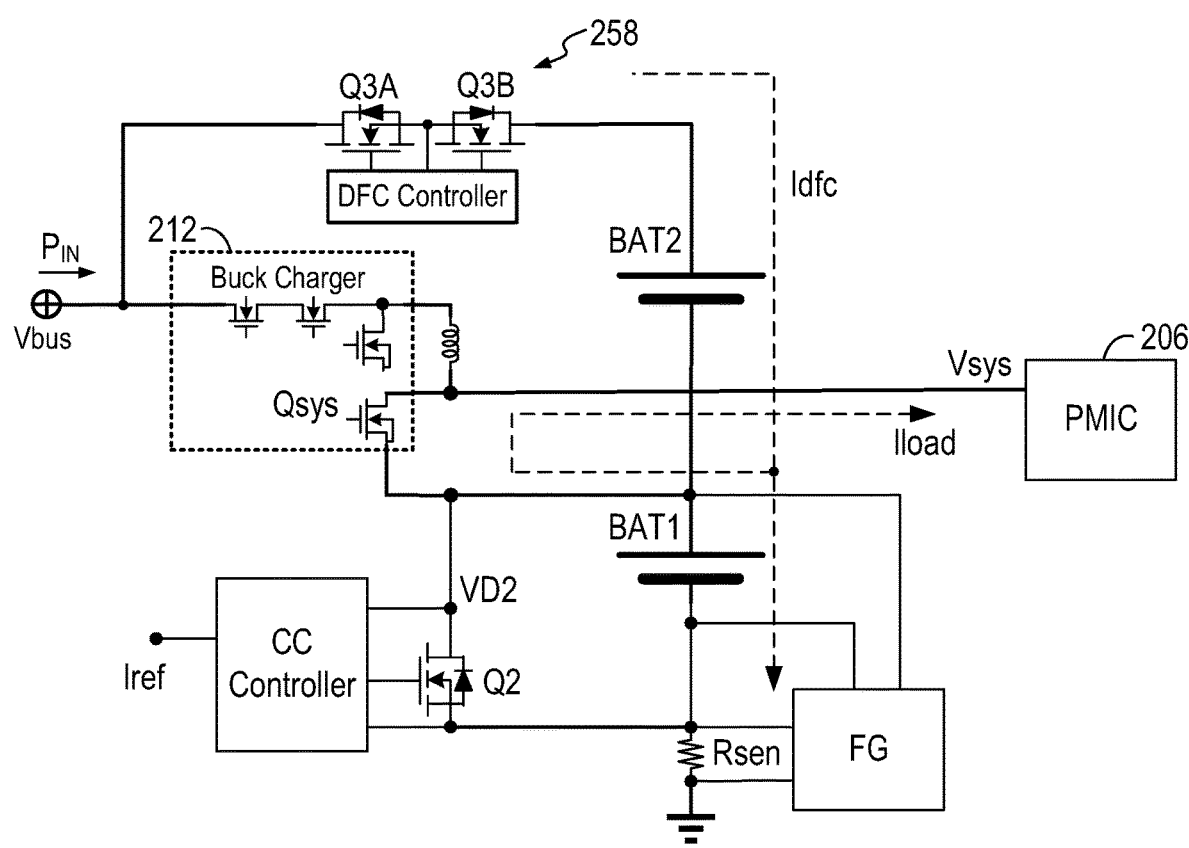
FIG. 7D illustrates examples of currents in a portable device, in an embodiment of the present invention.

1. 2S1P charging mode, using DFC (direct fast charge) technology, without a small current charger circuit involved (e.g., referred to as "first mode"):

More specifically, in an embodiment, the portable device 200 includes a PMIC (power management integrated circuit) 206 and system loads. The PMIC 206 can receive power from the batteries BAT1 and/or BAT2, and/or the power source 250, and provide regulated or adjusted power to the system loads. In an embodiment, the combined circuit of the PMIC 206 and the system loads can be referred to as a "load" in the portable device 200. In an embodiment, the load (e.g., including the PMIC 206 and the system loads) can be in an idle mode when the portable device 200 is in a low power consumption state, e.g., the portable device 200 is powered off or in a sleep mode. If the portable device 200 in a low power consumption state is charged by a higher-power-output adapter, then the portable device 200 can operate in the first mode.

a. In the first mode, the switch Q0 is on, and the switches Q1, Q2 and Q4 are off. The batteries BAT1 and BAT2 are coupled in series.

b. The charger circuit 212 is in an idle state (e.g., disabled), and the switch Qsys is on to provide a power voltage supply Vsys to the PMIC 206 (e.g., as shown in FIG. 7D).

c. In an embodiment, the adapter 250 coupled to the connection interface 252 includes a PPS (USB PD 3.0 Programmable Power Supply) capable power adapter. The SOC in the system controller 204 communicates with the adapter 250, e.g., via a communication bus 268, so that the adapter 250 provides a charging current and/or a charging voltage at a level that is requested by the SOC. The SOC also sends a command to the DFC controller 226 to enable on the DFC charging path 258 (e.g., by turning the switches Q3A and Q3B) to start a high-current DFC charging process.

d. In the first mode, the PMIC 206 receives relatively low power from a connection node between the batteries BAT1 and BAT2 (e.g., the positive terminal of the battery BAT1), and a voltage difference between the batteries BAT1 and BAT2 can be less than a predefined reference. In another embodiment, if the system loads are active and require some power and/or if the voltage difference between the batteries BAT1 and BAT2 is greater than the predefined reference, then the portable device 200 can operate in a second mode.

Figure 7E:
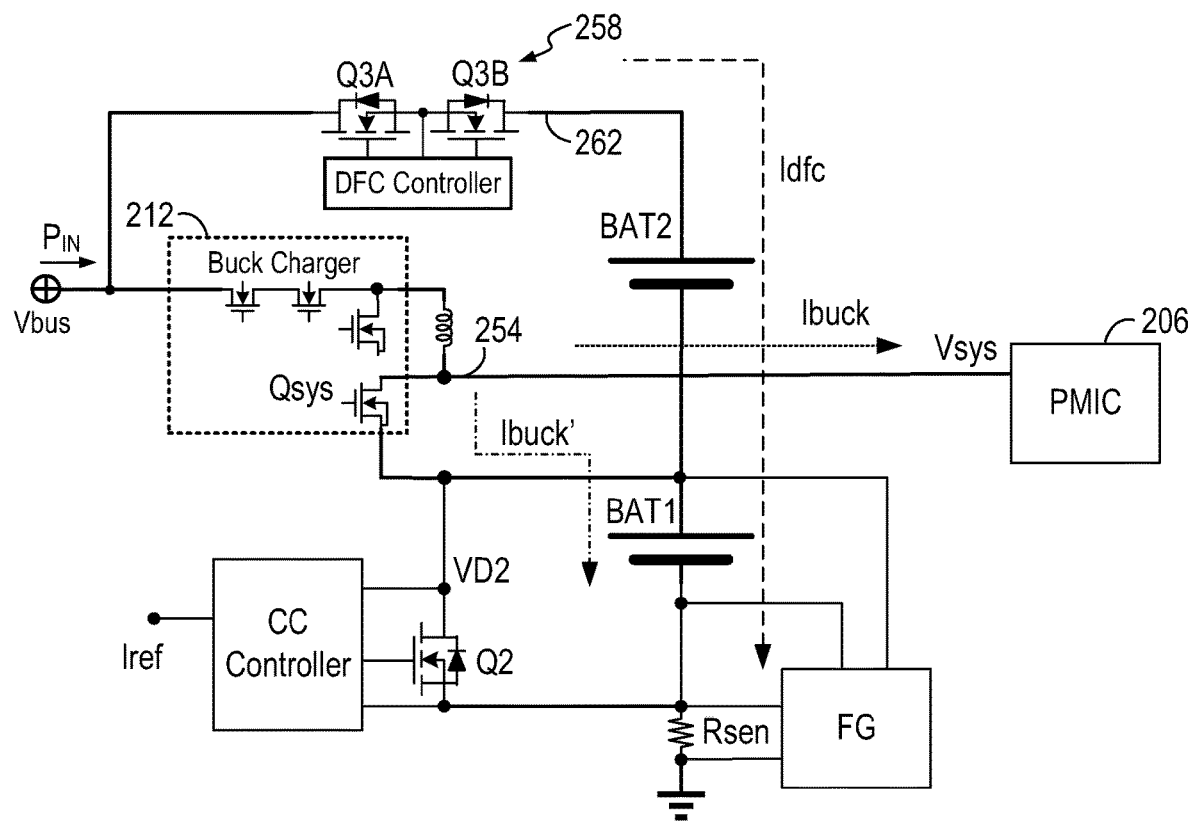
FIG. 7E illustrates examples of currents in a portable device, in an embodiment of the present invention.

2. 2S1P charging mode, using DFC technology, with a small current switching charger to provide Vsys to the PMIC 206 (e.g., referred to as "second mode"):

a. In the second mode, both the DFC charging path 258 (including switches Q3A and Q3B) and the charger circuit 212 are enabled. In the second mode, the switch Q0 is on, and the switches Q1, Q2 and Q4 are off.

b. If the portable device 200 is in an active mode and needs power, then the SOC can enable the charger circuit 212 to provide power to the PMIC 206 (e.g., as shown in FIG. 7A).

c. If the charger circuit 212 does not output enough power for heavy loading in the PMIC 206, the battery BAT1 is capable of providing an additional current for the heavy loading in the PMIC 206 (e.g., as shown in FIG. 7B or FIG. 7C).

d. Depending on the device loading dynamic range, the charger circuit can divert a small charging current to the battery BAT1 when the device loading is below the device's average loading and/or the battery BAT1's voltage is lower than the battery BAT2's voltage (e.g., as shown in FIG. 7E), or allow the battery BAT1 to supplement power to the device 200, e.g., to the PMIC 206, when the device loading is above the average and/or the battery BAT1's voltage is higher than the battery BAT2's voltage. Thus, by charging and discharging the battery BAT1, the charger circuit 212 can reduce an unbalance between batteries BAT1 and BAT2 in the second mode.

3. 2S1P charging mode, using a charger circuit, to charge the batteries BAT1 and BAT2 (e.g., referred to as "ninth mode"):

In an embodiment, the portable device 200 can also include a load (not shown in FIG. 2) that has an operating input voltage that is compatible with two batteries coupled in series. In one such embodiment, the portable device 200 can operate in the ninth mode, in which the charger circuit 212 charges the batteries BAT1 and BAT2 coupled in series, and powers the load.

a. In the ninth mode, the switches Q0 and Q4 are on, and the switches Q1, Q2 and Qsys are off.

b. The DFC charging path 258 is disabled, and the charger circuit 212 is enabled. A higher-output-power adapter (e.g., 20V/5 A) can provide input power $P_{IN}$ to the charger circuit 212. The charger circuit 212 converts the input power $P_{IN}$ to a regulated output voltage or a regulated output current to charge the batteries BAT1 and BAT2, via the switches Q4 and Q0.

c. The load is coupled to the output terminal 254 of the charger circuit 212, and receives power from the output terminal 254.

4. 5V Type-C/USB Input:

In an embodiment, if a lower-output-power adapter (e.g., a 5V Type-C/USB adapter) is used to charge the portable device 200, then the switch circuits (e.g., including the switches Q0, Q1, Q2 and Q4) are controlled such that the adapter charges the battery BAT1 or BAT2 individually (e.g., referred to as "1S1P charging"), or charges the batteries BAT1 and BAT2 in parallel (e.g., referred to as "1S2P charging").

a. 1S1P charging mode:

i. In an embodiment, the portable device 200 determines which battery is to be charged first.

ii. In an embodiment, the battery BAT1 can be used as a primary battery and the battery BAT2 can be used as a secondary battery like a smart powerbank.

iii. In an embodiment, the battery BAT1 can be set to be charged first if the battery BAT1's voltage is lower than the battery BAT2's voltage.

(1) DFC charging mode (e.g., referred to as "third mode"):

(a) In the third mode, the switches Q0 and Q2 are off, the switch Q1 is on, and the DFC charging path 258 (e.g., including the switches Q3A and Q3B) is on.

(b) A high charging current, from the power source 250, can go through the DFC charging path 258 and the switch Q1 to charge the battery BAT1 without enabling the charger circuit 212, to increase the charging efficiency.

(c) In an embodiment, the switch Q4 can be turned on to supply power from the DFC charging path 258 to the PMIC 206. In another embodiment, the switch Q4 can be turned off if the switch Qsys is on, and the switches Q1 and Qsys can deliver power from the DFC charging path 258 to the PMIC 206.

(d) In an embodiment, the switch Qsys can be turned on, and the switch Q4 can be turned off. In another embodiment, the switch Qsys can be turned off and the switch Q4 can be turned on. In yet another embodiment, both the switches Qsys and Q4 can be turned on.

(e) In an embodiment, the lower-output-power adapter (e.g., a 5V Type-C/USB adapter) can receive a request/command from a controller (e.g., the controller 204) in the portable device 200 so that the adapter provides a voltage (or a current) at a preset level as requested by the portable device 200. Thus, the adapter can charge the battery BAT1 in different modes (e.g., including, but not limited to, a trickle charging mode, a constant-current charging mode, a constant-voltage charging mode, etc.) according to a status of the battery BAT1. The adapter can charge the battery BAT1 to be fully charged via the DFC charging path 258. However, the invention is not so limited. In another embodiment, the battery BAT1 can be fully charged by the charger circuit 212, as described below.

(2) Switching Buck mode (e.g., referred to as "fourth mode"):

(a) In an embodiment, when the battery BAT1's voltage reaches a certain level such as a CV (constant voltage) point, the controller 204 can control the portable device 200 to operate in a switching charger mode. In other words, the controller 204 enables the charger circuit 212.

(b) The DFC charging path 258 (e.g., including the switches Q3A and Q3B) is off. The switches Q0, Q1, and Q4 are off, and the switch Q2 can be on.

(c) In the abovementioned example, the controller 204 enables the charger circuit 212 when the battery BAT1's voltage reaches a CV reference level. However, the invention is not so limited. In another embodiment, the controller 204 can enable the charger circuit 212 to charge the battery BAT1 when the battery BAT1's voltage increases to a predefined voltage level less than the CV reference level. In one such embodiment, the charger circuit 212 charges the battery BAT1 in a constant current mode, a constant voltage mode, etc., according to a status of the battery BAT1. Additionally, if the battery BAT1's voltage is less than a voltage reference, e.g., an under-voltage threshold, then the controller 204 can enable the charger circuit 212 to charge the battery BAT1 in a trickle charge mode with a relatively small current.

(3) When the battery BAT1 is charged by the charger circuit 212, the battery BAT2 can be in an idle mode, or in a constant-current discharge mode to charge the battery BAT1, thereby balancing the batteries BAT1 and BAT2. As used herein, "a battery is in an idle mode" means the battery is neither charged nor discharged. As used herein, "balancing the batteries BAT1 and BAT2" means reducing a difference between a battery voltage $V_{BAT1}$ of the battery BAT1 and a battery voltage $V_{BAT2}$ of the battery BAT2. In an embodiment, if the voltage difference between the batteries BAT1 and BAT2 is less than a preset reference $\Delta Vt2$, then the batteries BAT1 and BAT2 are considered to be balanced.

Figure 3A:
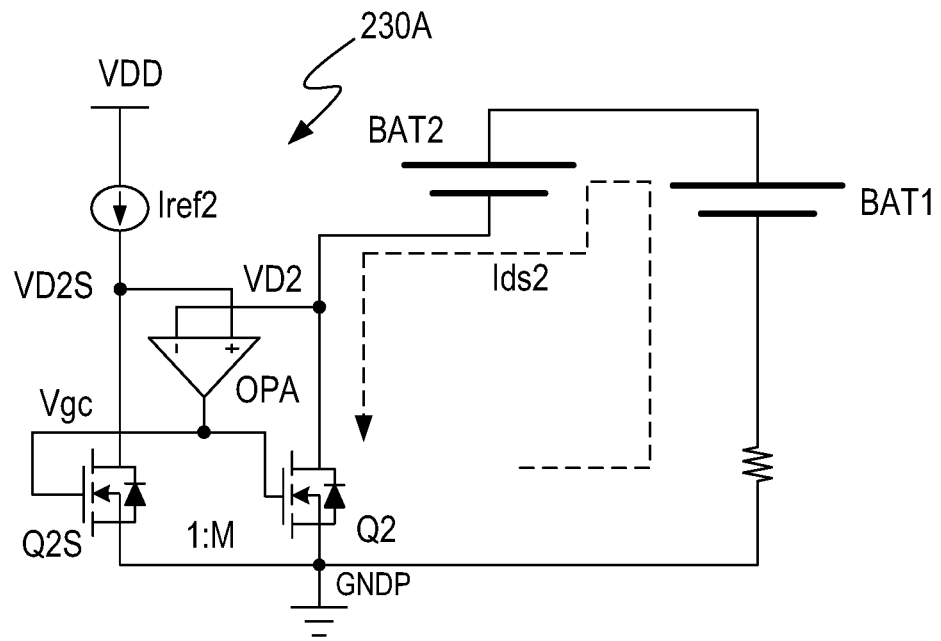
FIG. 3A illustrates a circuit diagram of an example of a current controller for controlling a switch, in an embodiment of the present invention.
Figure 3B:
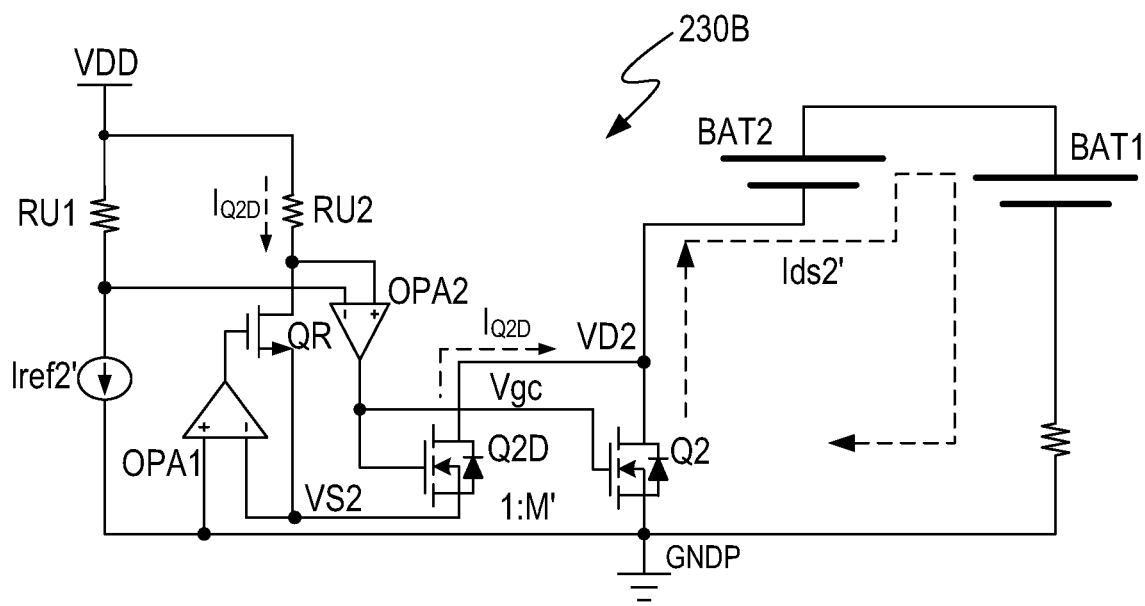
FIG. 3B illustrates a circuit diagram of an example of a current controller for controlling a switch, in an embodiment of the present invention.

(a) A controller 230, e.g., a constant-current controller (hereinafter, CC2 controller), can control the switch Q2 to be in a linear mode so that the battery BAT2 can charge the battery BAT1 in a constant current mode (e.g., as shown in FIG. 3B). The charging current can flow from the battery BAT2 through the switch Q1 to the battery BAT1.

Figure 4:
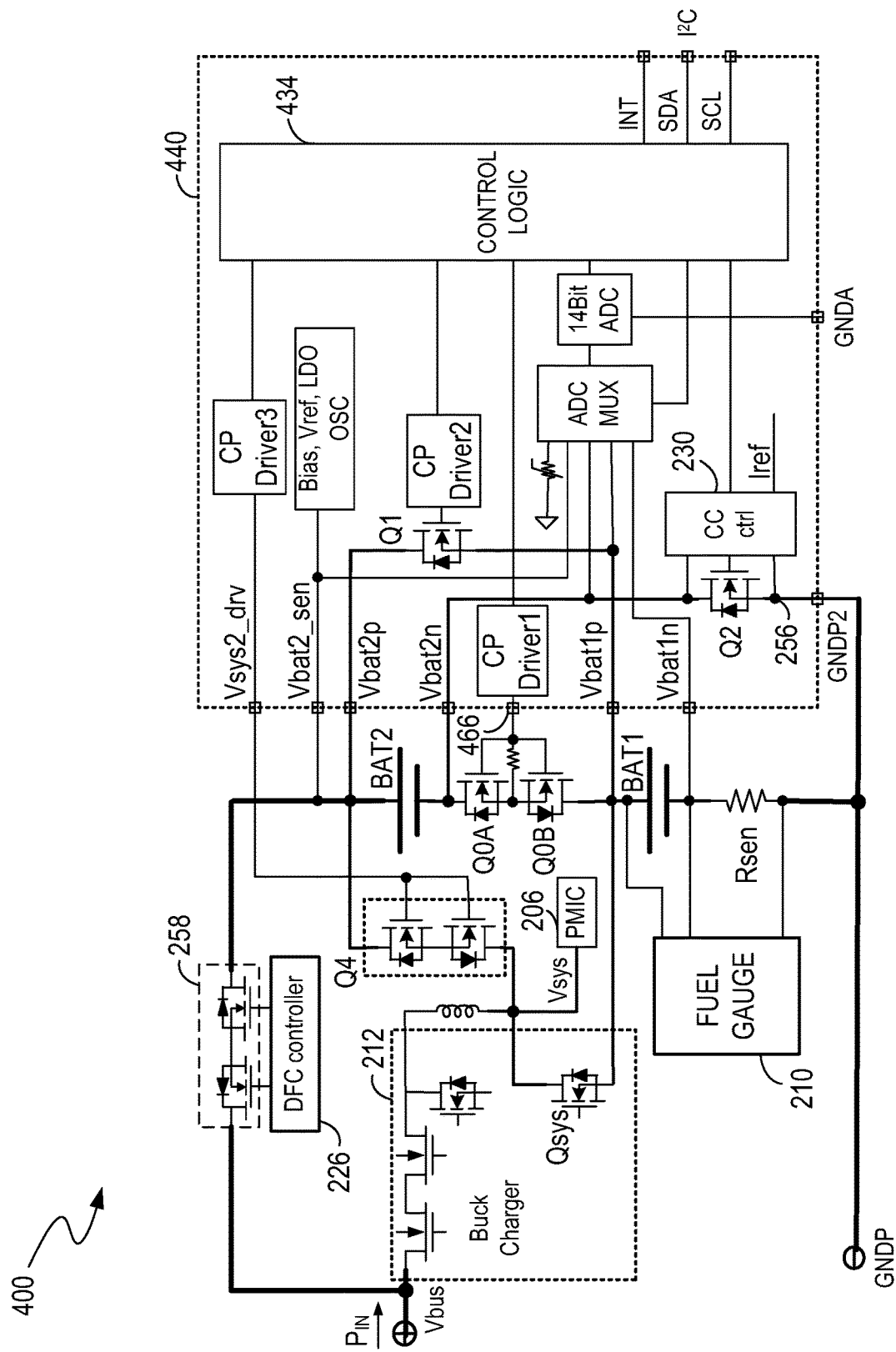
FIG. 4 illustrates an example of an arrangement of batteries for a portable device, in an embodiment of the present invention.
Figure 5A:
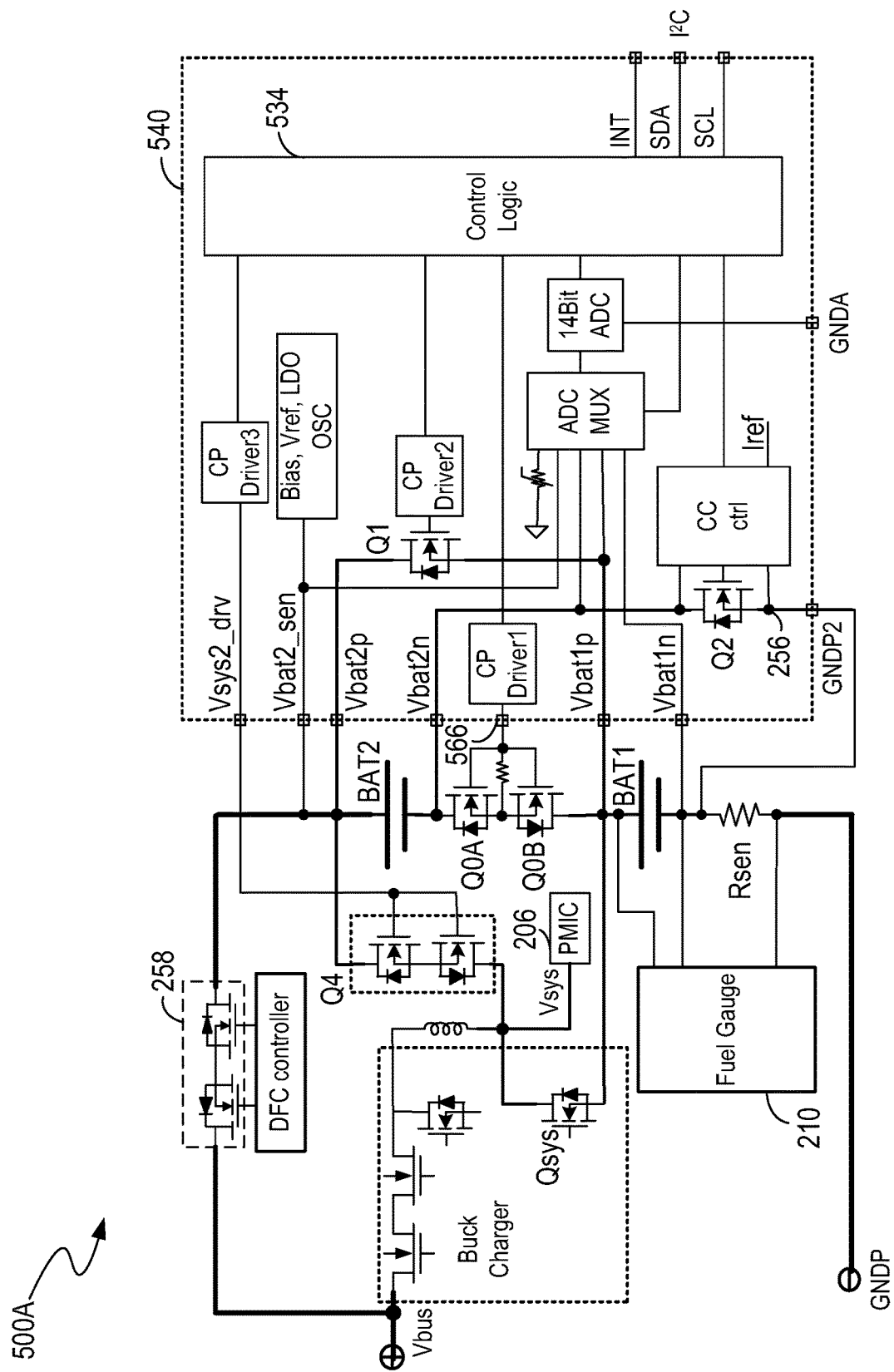
FIG. 5A illustrates an example of an arrangement of batteries for a portable device, in an embodiment of the present invention.

(b) The charging current can be selected/adjusted based on a voltage difference between the batteries BAT1 and BAT2, and based on a maximum allowed power dissipation for a controller IC (e.g., including a battery management circuit 440 in FIG. 4, or including a battery management circuit 540 in FIG. 5A).

(c) The charging current's value can be increased when the voltage difference between the batteries BAT1 and BAT2 decreases, thereby speeding up the balance process and reducing the battery balance time.

(d) If the controller IC's temperature rises to a certain predefined level, then the discharging from the battery BAT2 to the battery BAT1 can be stopped.

iv. If the battery BAT1's voltage $V_{BAT1}$ (or capacity $C_{BAT1}$) is greater than that of the battery BAT2 by a predefined amount $\Delta Vt$ (or $\Delta Ct$), then the battery BAT2 can be set to be charged by the charger circuit 212, and the battery BAT1 can be in an idle mode, or in a discharging mode.

(1) Switching Buck mode (e.g., referred to as "fifth mode"):

(a) In the fifth mode, the controller 204 sends commands, e.g., via a communication bus 268, to the charger circuit 212 to turn off the switch Qsys while maintaining the charger circuit 212 as functioning.

(b) The switches Q0 and Q1 are off, and the switches Q2 and Q4 are on. Thus, a charging current from the charger circuit 212 can flow through the switch Q4, the battery BAT2, and the switch Q2. In addition, the battery BAT1 is in an idle mode.

(c) In an embodiment, the charger circuit 212 can charge the battery BAT2 in different modes (e.g., including, but not limited to, a trickle charging mode, a constant-current charging mode, a constant-voltage charging mode, etc.) according to a status of the battery BAT2. The charger circuit 212 can charge the battery BAT2 to be fully charged.

(d) The battery BAT2 can also be used to supplement power to the load (e.g., including the PMIC 206 and the system loads shown in FIG. 2) through the switch Q4 if the power provided by the switching charger 212 is less than the load's required power.

(e) A fuel gauge 210, configured to estimate a remaining capacity of the battery BAT1 based on a sense resistor $R_{SEN}$ as shown in FIG. 2, can operate in an idle mode (e.g., disabled) because the battery BAT1 is in an idle mode and no current flows through the battery BAT1 and the sense resistor $R_{SEN}$.

(2) DFC charging mode (e.g., referred to as "sixth mode"):

(a) In the sixth mode, the battery BAT2 can be charged via the DFC charging path 258. In the sixth mode, the switch Q4 can be omitted from the portable device 200. As mentioned above, the portable device 200 can, but not necessarily, include the switch Q4. By way of example, the portable device 200 can be compatible with a lower-output-power adapter, e.g., a 5V Type-C or USB adapter, that is capable of receiving a request/command from a controller in the portable device 200, and capable of providing a voltage (or a current) at a preset level as requested by the portable device 200. Thus, the adapter can charge the battery BAT2 in different modes (e.g., including, but not limited to, a trickle charging mode, a constant-current charging mode, a constant-voltage charging mode, etc.) according to a status of the battery BAT2. The adapter can charge the battery BAT2 to be fully charged via the DFC charging path 258 and the switch Q2. In one such embodiment, the switch Q4 can be omitted from the portable device 200. In an embodiment, if the portable device 200 does not include the switch Q4, the batteries BAT1 and BAT2 can also operate in the abovementioned first, second, third, and fourth modes. However, if the portable device 200 does not include the switch Q4, then the batteries BAT1 and BAT2 do not operate in the abovementioned fifth mode, in which the battery BAT2 is charged by the charger circuit 212 via the switch Q4.

(b) In the sixth mode, the charger circuit 212 can also be enabled to provide power to the load (e.g., including the system loads and the PMIC 206). If additional power from the battery supplement is needed, and if the battery BAT1 has a higher battery voltage than the battery BAT2, then the switch Qsys can be turned on such that the battery BAT1 can supplement power to the PMIC 206.

b. 1S2P charging mode:

In the 1S2P charging mode, the batteries BAT1 and BAT2 are balanced and are coupled in parallel. The parallel-coupled batteries BAT1 and BAT2 can be charged via the DFC charging path 258, or via the charger circuit 212. In an embodiment, when the batteries BAT1 and BAT2 are charged via the DFC charging path 258, the switches Q1 and Q2 are on, and the switches Q0, Q4 and Qsys are off. In another embodiment, when the batteries BAT1 and BAT2 are charged via the charger circuit 212, the switches Q4, Q2 and Qsys are on, and the switches Q1 and Q0 are off.

i. Before the batteries BAT1 and BAT2 are configured in 1S2P, their initial voltages may be different and their voltage difference may be relatively large. In this condition, if the batteries BAT1 and BAT2 are directly connected in parallel, a large shorting current may occur to degrade or damage the batteries.

ii. In an embodiment, before enabling the DFC charging path 258 or the charger circuit 212, the portable device 200 can operate in a balancing mode. There are different situations in the balancing mode before the 1S2P charging.

(1) In an embodiment, the battery BAT1 has a higher voltage than the battery BAT2. The battery BAT1 can charge the battery BAT2 in a controlled manner (e.g., referred to as "seventh mode"). The balancing of the batteries BAT1 and BAT2 can be performed to reduce a voltage difference between the batteries BAT1 and BAT2 to be less than a predefined threshold $\Delta Vt2$ before the charger circuit 212 or the DFC charging path 258 is enabled to charge the batteries BAT1 and BAT2 in parallel.

(a) In the seventh mode, the switch Q0 is off, the switch Q1 is fully on, and the switch Q2 is in a linear mode. In an embodiment, the switch Q2 includes a MOSFET (metal-oxide semiconductor field-effect transistor), e.g., an n-channel MOSFET. In the linear mode, the switch Q2 is partially turned on, e.g., a gate-source voltage of the switch Q2 is greater than a turn-on threshold but less than a fully-turn-on threshold. In the linear mode, a current flowing through the switch Q2 can be controlled by voltages applied to the gate, source and drain terminals of the switch Q2.

(b) A charging current Ids2 flowing through the switch Q2 can be sensed by the CC2 controller 230.

(c) The sensed current Ids2 is compared, e.g., using the CC2 controller 230, with a target reference Iref2. If Ids2 is greater than Iref2, then the CC2 controller 230 can decrease the switch Q2's gate driving voltage so that the current Ids2 decreases. If Ids2 is less than Iref2, then the CC2 controller 230 can increase the switch Q2's gate driving voltage so that the current Ids2 increases.

(d) The target reference Iref2 is adjustable. For example, a control logic circuit (e.g., the circuit 434 in FIG. 4 or the circuit 534 in FIG. 5A) can increase or decrease the target reference Iref2 based on a maximum allowed target die temperature increase determined by the device package type (thermal resistance) of the abovementioned controller IC (e.g., the battery management circuit 440 in FIG. 4 or the battery management circuit 540 in FIG. 5A) based on a voltage difference between the batteries BAT1 and BAT2, and based on a maximum allowed power dissipation over the switch Q2.

(e) In an embodiment, the CC2 controller 230 can control the charging current Ids2 to be relatively small if a voltage difference $V_{BAT1}-V_{BAT2}$ between the batteries BAT1 and BAT2 is relatively large. The CC2 controller 230 can also increase the charging current Ids2 if the voltage difference $V_{BAT1}-V_{BAT2}$ decreases. Thus, the power consumed by the balancing of the batteries BAT1 and BAT2, e.g., Ids2* $(V_{BAT1}-V_{BAT2})$, is controlled to be in a predefined range. As a result, high temperature increase caused by the balancing can be avoided.

(f) The batteries BAT1 and BAT2 can be balanced through the switch Q2. The switch Q2 can work like a variable resistor, and the resistance of the switch Q2 can decrease until its minimum value is reached (e.g., the switch Q2 is fully turned on). For example, the CC2 controller 230 can increase the driving voltage at the gate of the switch Q2 to reduce the on-resistance $R_{DS(ON)}$ of the switch Q2 as the voltage difference $V_{BAT1}-V_{BAT2}$ decreases. When the voltage difference $V_{BAT1}-V_{BAT2}$ decreases to a preset reference, the CC2 controller 230 can fully turn on the switch Q2.

(2) In another embodiment, the battery BAT2 has a higher voltage than the battery BAT1. The battery BAT2 can charge the battery BAT1 in a controlled manner (e.g., referred to as "eighth mode"). The balancing of the batteries BAT1 and BAT2 can be performed to reduce the voltage difference $V_{BAT2}-V_{BAT1}$ between the batteries BAT1 and BAT2 to be less than a predefined threshold ΔVt2 before the switching charger 212 or the DFC charger (e.g., including the DFC controller 226 and the switches Q3A and Q3B) is enabled to charge the batteries BAT1 and BAT2 in parallel.

(a) In an embodiment, in the eight mode, the switches Q0 and Q4 are off, the switch Q2 is on, and the switch Q1 is in a linear mode. In an embodiment, the switch Q1 includes a MOSFET, and the linear mode of the switch Q1 is similar to the linear mode of the switch Q2.

(b) A charging current Ids1 flowing through Q1 can be sensed by a CC1 controller 232.

(c) The sensed current Ids1 is compared, e.g., using the CC1 controller 232, with a target reference Iref1. If Ids1 is greater than Iref1, then the CC1 controller 232 can decrease the switch Q1's gate driving voltage so that the current Ids1 decreases. If Ids1 is less than Iref1, then the CC1 controller 232 can increase the switch Q1's gate driving voltage so that the current Ids1 increases.

(d) Similar to the target reference Iref2, the target reference Iref1 is adjustable.

(e) In an embodiment, the CC1 controller 232 can control the charging current Ids1 to be relatively small if the voltage difference $V_{BAT2}-V_{BAT1}$ between the batteries BAT1 and BAT2 is relatively large. The CC1 controller 232 can also increase the charging current Ids1 if the voltage difference $V_{BAT2}-V_{BAT1}$ decreases. Thus, the power consumed by the balancing of the batteries BAT1 and BAT2, e.g., Ids1* $(V_{BAT2}-V_{BAT1})$, is controlled to be in a predefined range. As a result, high temperature increase caused by the balancing can be avoided.

(f) The batteries BAT1 and BAT2 can be balanced through the switch Q1. The switch Q1 can work like a variable resistor, and the resistance of the switch Q1 can decrease until its minimum value is reached (e.g., the switch Q1 is fully turned on). For example, the CC1 controller 232 can increase the driving voltage at the gate of the switch Q1 to reduce $R_{DS(ON)}$ of the switch Q1 as the voltage difference $V_{BAT2}-V_{BAT1}$ decreases. When the voltage difference $V_{BAT2}-V_{BAT1}$ decreases to a preset reference, the CC1 controller 232 can fully turn on the switch Q1.

(g) In another embodiment, the batteries BAT1 and BAT2 can be balanced using the switch Q2. In one such embodiment, the CC2 controller 230 can control the switch Q2 to operate in a linear mode, and the CC1 controller 232 can fully turn on the switch Q1. A different current sense method can be used to sense a discharging current Ids2' of the battery BAT2 because the polarity of voltage drop over the switch Q2 when the battery BAT2 is in a discharge mode is different from (e.g., in reverse to) that when the battery BAT2 is in a charge mode, e.g., the discharging current Ids2' flows in a direction that is opposite that of the charging current Ids2. In one such embodiment, the CC1 controller 232 (e.g., a constant-current controller) can be replaced by a regular/simple CP (charge-pump) driver that either turns on or turns off the switch Q1, and the printed circuit board (PCB) size and/or cost for the portable device 200 can be reduced.

(3) In an abovementioned embodiment, the charger circuit 212 can be enabled after the balancing of the batteries BAT1 and BAT2 is performed, e.g., the voltage difference between the batteries BAT1 and BAT2 is reduced to a predefined threshold ΔVt2. In another embodiment, the charger circuit 212 can be enabled before the balancing of the batteries BAT1 and BAT2. For example, the charger circuit 212 can be enabled to charge the battery BAT1 or the battery BAT2 via the switch Qsys or the switch Q4 to ensure that the voltage difference between the batteries BAT1 and BAT2 is small enough before the balancing is performed, thereby reducing potential thermal issues. More specifically, the SOC in the controller 204 can control the switches Q0, Q1, Q2, Q4 and Qsys in manners similar to those in the abovementioned fourth mode and fifth mode of the 1S1P charging mode. The battery with a lower voltage can be selected to be charged by the charger circuit 212 until the battery voltage difference between the batteries BAT1 and BAT2 reduces to a target value ΔVt (ΔVt>ΔVt2). When the battery voltage difference between the batteries BAT1 and BAT2 reduces to the target value ΔVt, the abovementioned balancing of the batteries BAT1 and BAT2 can start to be performed; in an embodiment, in this condition, the charger circuit 212 can be disabled.

(4) In another embodiment, the charger circuit 212 can continue to charge the battery with a lower voltage. In other words, when the charger circuit 212 is charging the battery with a lower voltage, the battery with a higher voltage can also charge the battery with the lower voltage if a voltage difference condition is met, e.g., the voltage difference between the batteries BAT1 and BAT2 is less than the target value ΔVt.

5. 1S1P discharging mode:

When the portable device 200 is not coupled to a power source 250, the portable device 200 can be powered by the battery BAT1 or the battery BAT2.

a. In an embodiment, the battery BAT1 is selected to power the PMIC 206 and the system loads. The switch Qsys is on to allow a supply current to flow from the battery BAT1 to the PMIC 206. The battery BAT2 is in an idle mode. The switch Q2 is on to connect the negative terminal of the battery BAT2 to the reference ground GNDP, and the switches Q0, Q1 and Q4 are off.

b. In another embodiment, the battery BAT2 is selected to power the PMIC 206 and the system loads. The switches Q2 and Q4 are on to allow a supply current to flow from the battery BAT2 to the PMIC 206. The battery BAT1 is in an idle mode, and the switches Qsys, Q0 and Q1 are off c. The batteries BAT1 and BAT2 can be balanced by selecting the battery with a higher battery voltage to power the PMIC 206.

6. 1S2P discharging mode:

When the portable device 200 is not coupled to a power source 250, the portable device 200 can be powered by the batteries BAT1 and BAT2 in parallel if the two batteries are balanced, e.g., a voltage difference between the batteries BAT1 and BAT2 is relatively small, e.g., less than a threshold ΔVt2.

a. In an embodiment, the switches Qsys, Q2 and Q4 are turned on (e.g., fully turned on), and the switches Q0 and Q1 and are turned off. In another embodiment, the switch Q2 can operate in a linear mode if the battery BAT2's voltage is greater than the battery BAT1's voltage.

b. In another embodiment, the switches Qsys, Q2 and Q1 are turned on (e.g., fully turned on), and the switches Q0 and Q4 and are turned off. In yet another embodiment, the switch Q1 or Q2 can operate in a linear mode if the battery BAT2's voltage is greater than the battery BAT1's voltage.

7. 2S1P discharging mode (e.g., referred to as "tenth mode"):

In an embodiment, the portable device 200 can also include a load (not shown in FIG. 2) that has an operating input voltage that is compatible with two batteries coupled in series. In one such embodiment, the portable device 200 can operate in the tenth mode, in which the load is powered by the batteries BAT1 and BAT2 coupled in series.

a. In the tenth mode, the switches Q0 and Q4 are on, and the switches Q1, Q2 and Qsys are off. The batteries BAT1 and BAT2 are coupled in series.

b. The load is coupled to the positive terminal of the battery BAT2 through the switch Q4.

In the example of FIG. 2, a single-battery fuel gauge 210 is used to record a charging current or discharging current of the battery BAT1, and report the remaining capacity based on the battery BAT1. In an embodiment, as mentioned above, because the batteries BAT1 and BAT2 can be balanced during the charging and discharging processes, the estimated remaining capacity of the battery BAT1 can also represent an estimated remaining capacity of the battery BAT2. Thus, an additional fuel gauge for the battery BAT2 is not needed.

Accordingly, in some embodiments of the present invention, the portable device may have advantages as follows.

1. The relatively expensive buck-boost switching charger 112 mentioned in relation to the conventional portable device 100 can be omitted, and replaced by a simple and low-cost buck charger 212. Thus, the cost and the power consumption of the portable device 200 can decrease. The efficiency of charging the batteries in the portable device 200 can also increase.

2. The switched capacitor buck converter 108 of the conventional portable device 100 can also be omitted in the portable device 200, thereby eliminating the power conversion loss cause by the switched capacitor buck converter 108.

3. Because the batteries BAT1 and BAT2 can be balanced during charging and discharging processes, a fuel gauge 210 coupled to the battery BAT1 can be used to estimate the remaining capacities of both the batteries BAT1 and BAT2. In other words, an additional fuel gauge for the battery BAT2 can be (but not necessarily) omitted, thereby reducing the cost, the power consumption, and the PCB size for the portable device 200.

4. The portable device 200 is compatible with a higher-output-power adapter (e.g., 20V/5 A) and a lower-output-power adapter (e.g., 5V/2 A). In addition, the portable device 200 can operate in a DFC (direct fast charge) mode regardless of whether the portable device 200 is charged by the higher-output-power adapter or the lower-output-power adapter.

FIG. 3A illustrates a circuit diagram of an example of a current controller 230A for controlling the switch Q2, in an embodiment of the present invention. FIG. 3A is described in combination with FIG. 2. In an embodiment, the abovementioned CC2 controller 230 in FIG. 2 includes the current controller 230A in FIG. 3A. The current controller 230A can control the switch Q2 to operate in a linear mode. In the example of FIG. 3A, the controller 230A controls the abovementioned charging current Ids2 flowing from the battery BAT1 to the battery BAT2 through the switch Q2, e.g., in the seventh mode.

As show in FIG. 3A, a switch Q2S, e.g., a MOSFET, is coupled in parallel with the switch Q2, e.g., a MOSFET. The switch Q2S can be used to sense the current Ids2 flowing through the switch Q2. The sources of the switches Q2S and Q2 are coupled to the same terminal GNDP, and the gates of the switches Q2S and Q2 are coupled to the same terminal, e.g., an output terminal of an operational amplifier OPA shown in FIG. 3A, and therefore the switches Q2S and Q2 have the same source voltage and the same gate voltage. Additionally, their drain terminals can be forced to have substantially the same voltage potential, e.g., VD2 is equal to VD2S, by the operational amplifier OPA. Thus, the charging current Ids2 can be determined by factors including a reference current Iref2 flowing through the switch Q2S and a size ratio M between the switches Q2S and Q2 (e.g., $M = RA_{Q2}/RA_{Q2S}$, where $RA_{Q2}$ represents the W/L ratio of the switch Q2, and $RA_{Q2S}$ represents the W/L ratio of the switch Q2S). In an embodiment, if the reference current Iref2 and the size ratio M are determined, then the charging current Ids2 can be determined. For example, the charging current Ids2 can be given by: Ids2=Iref2*M. In an embodiment, the reference current Iref2 and/or the size ratio M can be programmable to achieve different charging current levels Ids2 for the battery BAT2.

In an embodiment, when the voltage difference between the batteries BAT1 and BAT2 decreases, the battery BAT2's charging current Ids2 can be increased to speed up the balancing of the batteries BAT1 and BAT2 without generating excessive heat in the switch Q2.

FIG. 3B illustrates a circuit diagram of an example of a current controller 230B for controlling the switch Q2, in an embodiment of the present invention. FIG. 3B is described in combination with FIG. 2 and FIG. 3A. In an embodiment, the CC2 controller 230 in FIG. 2 can include not only the current controller 230A in FIG. 3A, but also the current controller 230B in FIG. 3B. In one such embodiment, the CC1 controller 232 shown in FIG. 2 can be omitted and replaced by a regular/simple CP (charge-pump) driver. The current controller 230B can control the switch Q2 to operate in a linear mode. In the example of FIG. 3B, the controller 230B controls the abovementioned discharging current Ids2' flowing from the battery BAT2 to the battery BAT1 through the switch Q2, e.g., in the eighth mode.

In the example of FIG. 3B, the drain voltage VD2 of the switch Q2 is negative because the discharging current Ids2' flows through the switch Q2 from the ground GNDP to the drain terminal of the switch Q2. The drain voltage VD2 is controlled such that a voltage across the switch Q2's body diode is less than the body diode's threshold voltage (e.g., so that the body diode is turned off), thereby producing a condition in which the switch Q2 can be controlled to operate in a linear mode. In this example, the switches Q2 and Q2D share the same gate control signal (e.g., Vgc) and the same drain control signal (e.g., VD2). An operational amplifier OPA1 forces the switch Q2D's source voltage to be substantially equal to the switch Q2's source voltage, e.g., which is a ground voltage. Thus, the switches Q2 and Q2D can have the same source voltage, drain voltage, and gate voltage, and therefore the discharging current Ids2' flowing through the switch Q2 can be proportional to a current $I_{Q2D}$ flowing through the switch Q2D.

Additionally, as shown in FIG. 3B, the switch Q2D's current $I_{Q2D}$ flows through the pull-up resistor RU2, and therefore a voltage drop is generated across the pull-up resistor RU2. A reference current Iref2' flows through a resistor RU1, and therefore a reference voltage drop is generated across the resistor RU1. An operational amplifier OPA2 compares the voltage of the resistor RU1 with the voltage of the resistor RU2 to regulate a common-gate voltage Vgc of the switches Q2 and Q2D. In an embodiment, the reference current Iref2', the resistance ratio between the resistors RU1 and the RU2, and/or a size ratio M' between the switch Q2 and the switch Q2D are programmable, and can be programmed to satisfy different current requirements for proper constant power control over the switch Q2.

FIG. 4 illustrates an example of an arrangement of batteries for a portable device 400, in an embodiment of the present invention. The portable device 400 can be an example of the portable device 200 in FIG. 2. Some elements shown in FIG. 2 (e.g., including the interface 252, the system controller 204, etc.) are not shown in FIG. 4. The CC1 controller 232 in FIG. 2 is replaced by a charge pumper driver CP Driver2 in FIG. 4. FIG. 4 is described in combination with FIG. 2, FIG. 3A and FIG. 3B.

In the example of FIG. 4, the switch Q0 includes a pair of MOSFETs Q0A and Q0B, and the body diodes of the switches Q0A and Q0B are reversely connected. When the switch Q0 is turned off, e.g., both the switches Q0A and Q0B are turned off, no leakage current can flow through the switch Q0. Similarly, the switch Q4 includes a pair of MOSFETs, and the body diodes of the MOSFETs are reversely connected, and therefore no leakage current can flow through the switch Q4 when the switch Q4 is turned off.

As shown in FIG. 4, the switch Q0 (e.g., including switches Q0A and Q0B), the switch Q1 and the switch Q4 are controlled by charge-pump drivers CP Driver1, CP Driver2, and CP Driver3, respectively. The switch Q2 is controlled by the CC (constant-current) controller 230. The charge-pump drivers CP Driver1, CP Driver2, and CP Driver3 and the CC controller 230 are controlled by a control logic circuit 434 according to statues (e.g., signals received at the terminals labeled "Vbat1n," "Vbat1p," "Vbat2n," "Vbat2p," and "Vbat2_sen") of the portable device 400. In other words, the switches Q0, Q1, Q2 and Q4 can be controlled by the control logic circuit 434. The control logic circuit 434 can be an embodiment of the controller 216 in FIG. 2.

Figure 5B:
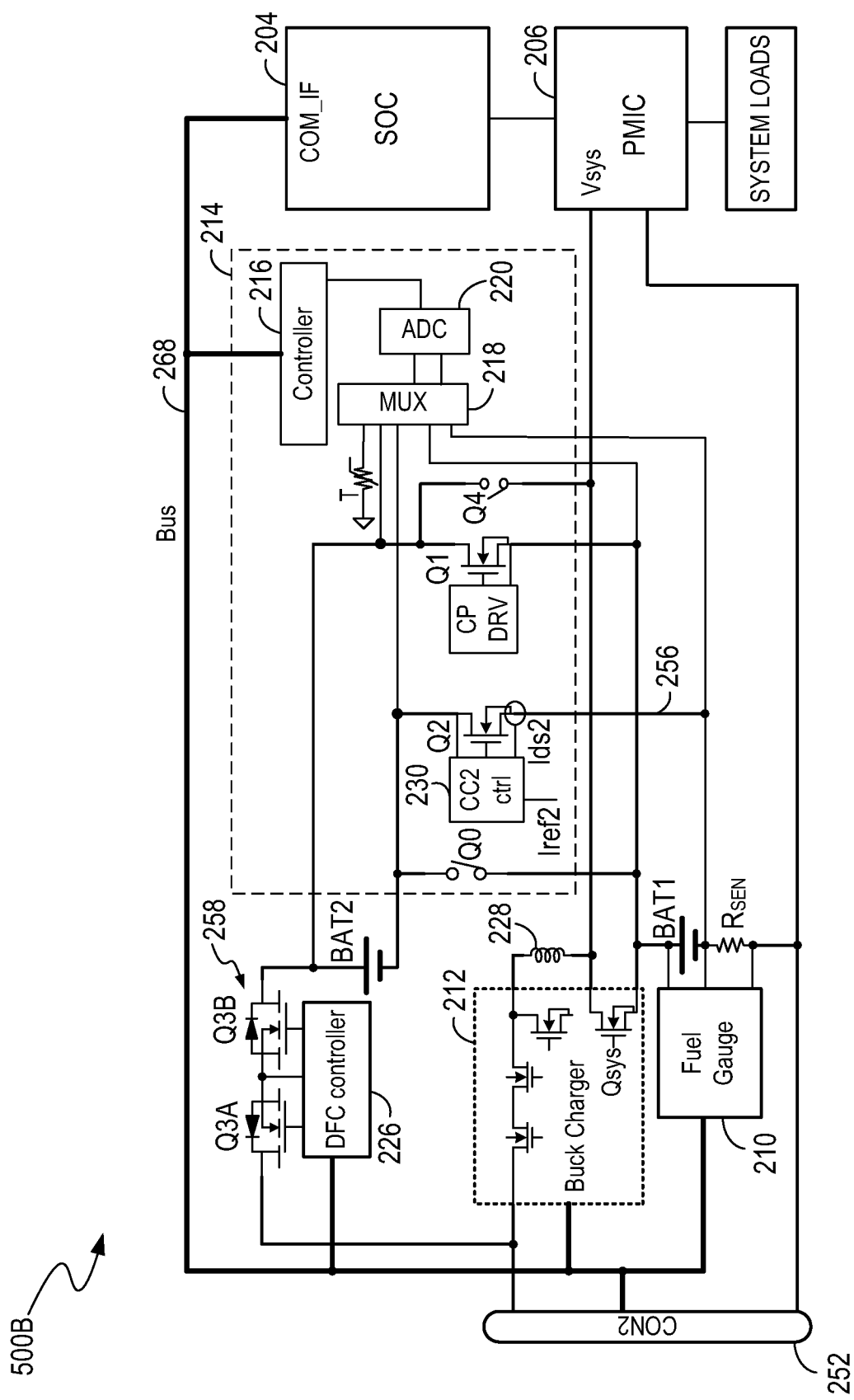
FIG. 5B illustrates an example of an arrangement of batteries for a portable device, in an embodiment of the present invention.

FIG. 5A illustrates another example of an arrangement of batteries for a portable device 500A, in an embodiment of the present invention. FIG. 5B illustrates a simplified version 500B of the batteries' arrangement for the portable device 500A, in an embodiment of the present invention. FIG. 5A and FIG. 5B are described in combination with FIG. 2, FIG. 3A, FIG. 3B and FIG. 4.

The portable device 500A in FIG. 5A is similar to the portable device 400 in FIG. 4 except that the battery management circuit 540 in FIG. 5A has a ground GNDP2 different from the ground GNDP of the portable device 500A, while the battery management circuit 440 in FIG. 4 and the portable device 400 share the same ground GNDP. More specifically, in FIG. 5A, the source terminal 256 of the switch Q2 is coupled to the negative terminal of the battery BAT1, and is also coupled to the ground GNDP of the portable device 500A via the sense resistor Rsen, while in FIG. 4, the source terminal 256 of the switch Q2 is coupled to the ground GNDP of the portable device 400, and is also coupled to the negative terminal of the battery BAT1 via the sense resistor Rsen.

Advantageously, in the examples of FIG. 5A and FIG. 5B, the batteries BAT1 and BAT2 share the same sense resistor Rsen. More specifically, the resistor Rsen can be used to sense a charging current provided from an outside power source 250 (e.g., an adapter) to the internal battery (e.g., the battery BAT1 alone, the battery BAT2 alone, the series-coupled batteries BAT1 and BAT2, or the parallel-coupled batteries BAT1 and BAT2). The resistor Rsen can also be used to sense a discharging current from the internal battery (e.g., the battery BAT1 alone, the battery BAT2 alone, or the parallel-coupled batteries BAT1 and BAT2) to the load in the portable device (e.g., including the PMIC 206). Additionally, the balancing current flowing between the batteries BAT1 and BAT2 in the abovementioned balancing mode does not flow through the resistor Rsen, and therefore the balancing current does not impact the estimation of the remaining capacity. As a result, the fuel gauge 210 can accurately estimate the total remaining capacity of the batteries BAT1 and BAT2.

Figure 6A:
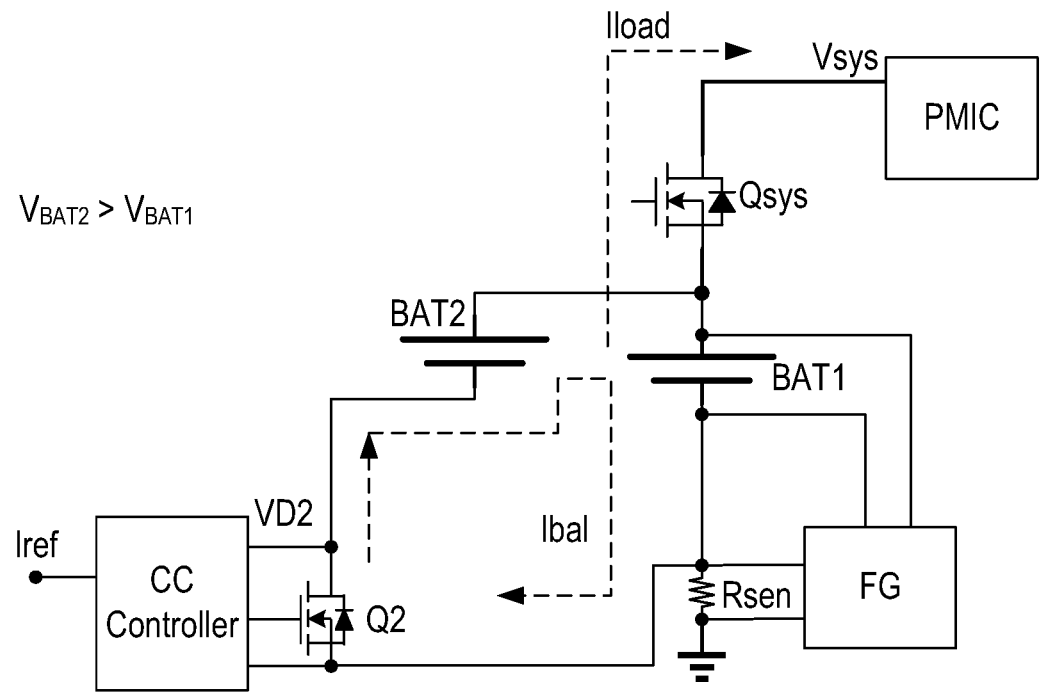
FIG. 6A illustrates an example of a balancing current between batteries in a portable device, in an embodiment of the present invention.
Figure 6B:
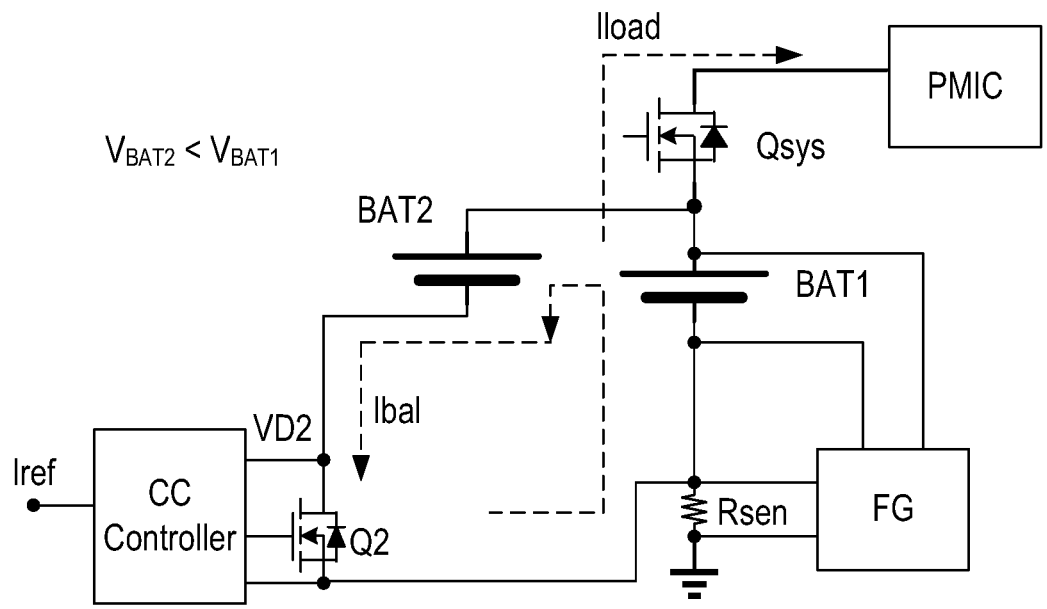
FIG. 6B illustrates an example of a balancing current between batteries in a portable device, in an embodiment of the present invention.

Examples of the abovementioned balancing current are illustrated in FIG. 6A and FIG. 6B, in embodiments of the present invention. FIG. 6A and FIG. 6B are described in combination with FIG. 5A and FIG. 5B. In the example of FIG. 6A, the battery BAT2's voltage $V_{BAT2}$ is greater than the battery BAT1's voltage $V_{BAT1}$, and the battery BAT2 discharges a balancing current Ibal to the battery BAT1. The balancing current Ibal does not flow through the resistor Rsen. In the example of FIG. 6B, the battery BAT1's voltage $V_{BAT1}$ is greater than the battery BAT2's voltage $V_{BAT2}$, and the battery BAT1 discharges a balancing current Ibal to the battery BAT2. The balancing current Ibal does not flow through the resistor Rsen.

FIG. 7A, FIG. 7B, FIG. 7C, FIG. 7D and FIG. 7E illustrate examples of currents in a portable device (e.g., 200, 400, 500A or 500B) when the portable device operates in the abovementioned 2S1P charging mode, in embodiments of the present invention. FIG. 7A, FIG. 7B, FIG. 7C, FIG. 7D and FIG. 7E are described in combination with FIG. 2, FIG. 4, FIG. 5A and FIG. 5B. As shown in FIG. 7A, FIG. 7B, FIG. 7C, FIG. 7D and FIG. 7E, in the 2S1P charging mode, the current flows can be controlled to enhance the performance and efficiency of the portable device 200.

More specifically, in the example of FIG. 7A, the DFC charging path 258 (e.g., including the switches Q3A and Q3B) is enabled to pass a fast-charge current Idfc to charge the batteries BAT1 and BAT2. The charger circuit 212 is enabled to provide a load current Ibuck to power the system load, e.g., via the PMIC 206, and the switch Qsys in the charger circuit 212 can be disabled. If the system load requires more power (e.g., it is detected that the supply voltage Vsys of the PMIC 206 decreases), and the current Ibuck has increased to a predefined current threshold, e.g., a maximum allowed output current, of the charger circuit 212, then the switch Qsys in the charger circuit 212 can be enabled. Thus, as shown in the example of FIG. 7B, an additional current Iload from the DFC charging path 258 can be provided to the PMIC 206 via the positive terminal of the battery BAT1. In another example shown in FIG. 7C, the battery BAT1 can also discharge to provide an additional current $I_{BAT1}$ to power the PMIC 206.

In an embodiment, the portable device 200 is in a low power consumption state (e.g., the portable device 200 is powered off or in a sleep mode, and the system load consumes relatively small power). In one such embodiment, as shown in FIG. 7D, the charger circuit 212 can be disabled, and the switch Qsys in the charger circuit 212 can be enabled. As a result, a relatively small current Iload can be provided from the DFC charging path 258 to power the PMIC 206 when the batteries BAT1 and BAT2 are being charged in a direct-fast-charge mode. In another embodiment, when the portable device 200 is in the low power consumption state, the current flows can also be controlled as shown in FIG. 7A, in which the charger circuit 212 is enabled to provide a relatively small current Ibuck to power the PMIC 206.

Additionally, in some embodiments, if the battery BAT1's voltage is less than the battery BAT2's voltage, e.g., by more than a balance threshold (e.g., a predefined voltage value), then as shown in FIG. 7E, the charger circuit 212 can provide an additional current Ibuck' to charge the battery BAT1. As a result, the batteries BAT1 and BAT2 can be balanced during the 2S1P charging mode.

Accordingly, embodiments according to the present invention provide portable devices (e.g., 200, 400, 500A, and 500B) that include a first battery BAT1 (e.g., including one or more battery cells) and a second battery BAT2 (e.g., including one or more battery cells).

More specifically, in an embodiment, a portable device (e.g., 200, 400, 500A, or 500B) includes a connection interface 252 (e.g., a Type-C or USB interface), a first battery BAT2, a second battery BAT2, and switch control circuitry. In some embodiments, the switch control circuitry can include an abovementioned controller 216, an abovementioned battery management circuitry 214, an abovementioned control logic circuit 434, or an abovementioned control logic circuit 534. In some other embodiments, the switch control circuitry can include a combined circuit of controllers 214 and 204, a combined circuit of the battery management circuitry 214 and the controller 204, a combined circuit of the control logic circuit 434 and the controller 204, or a combined circuit of the control logic circuit 534 and the controller 204.

The connection interface 252 connects the portable device (e.g., 200, 400, 500A, or 500B) to a power source 250 to receive input power $P_{IN}$. The first battery BAT1 has a positive terminal coupled to the connection interface 250 through a first switch Q1 and a DFC (direct-fast-charge) path 258 (e.g., including a charging switch Q3A and a discharging switch Q3B). The first battery BAT1 also has a negative terminal coupled to a reference terminal, e.g., a ground terminal GNDP of the portable device. The second battery BAT2 has a positive terminal coupled to the connection interface 250 via the DFC charging path 258, and has a negative terminal coupled to the reference terminal GNDP through a second switch Q2 and coupled to the positive terminal of the first battery BAT1 through a third switch Q0.

The switch control circuitry controls the switches Q1, Q2 and Q0 such that the portable device (e.g., 200, 400, 500A, or 500B) selectively operates in a mode of a set of modes. The set of modes includes at least a one-battery charging mode (e.g., the abovementioned 1S1P charging mode) and a two-battery-in-series charging mode (e.g., the abovementioned 2S1P charging mode). In the one-battery charging mode, the switch control circuitry turns off the third switch Q0, and controls the switches Q1 and Q2 such that a battery of the batteries BAT1 and BAT2 is charged by the input power $P_{IN}$ received at the connection interface 252. In the two-battery-in-series charging mode, the switch control circuitry turns off the switches Q1 and Q2 and turns on the third switch Q0, such that the batteries BAT1 and BAT2 are, e.g., coupled in series, and charged by the input power $P_{IN}$.

In an embodiment, the portable device (e.g., 200, 400, 500A, or 500B) also includes a charging path 258, a charger circuit 212, and a controller 204. As shown in the example of FIG. 2, the charging path 258 includes a first input terminal 260 coupled to the connection interface 252, and a first output terminal 262 coupled to the positive terminal of the second battery BAT2 and coupled to the positive terminal of the first battery BAT1 through the first switch Q1. The charging path 258 can deliver at least a part of the input power $P_{IN}$ received at the connection interface 252, from the first input terminal 260 to the first output terminal 262. The charger circuit 212 includes a second input terminal 264 coupled to the connection interface 252, and a second output terminal 254 coupled to the positive terminal of the first battery BAT1 (e.g., through a connection switch Qsys) and coupled to the positive terminal of the second battery BAT2 through the connection switch Qsys and the first switch Q1. The charger circuit 212 can convert at least a part of the input power $P_{IN}$ at the second input terminal 264 to regulated power at the second output terminal 254. The controller 204 can selectively enable at least one of the charging path 258 and the charger circuit 212. More specifically, in an embodiment, the controller 204 enables both the charging path 258 and the charger circuit 212. The charging path 258 can deliver a part of the input power $P_{IN}$ to the first output terminal 262, and the charger circuit 212 can convert the other part of the input power $P_{IN}$ to regulated power, and output the regulated power at the second output terminal 254. In another embodiment, the controller 204 enables the charging path 258 and disables the charger circuit 212. The charging path 258 may deliver all the input power $P_{IN}$ to its output terminal 262. Similarly, in yet another embodiment, the controller 204 disables the charging path 258 and enables the charger circuit 212. The charger circuit 212 may convert all the input power $P_{IN}$ to regulated power and output the regulated power at its output terminal 254.

In an embodiment, the portable device (e.g., 200, 400, 500A, or 500B) also includes a load (e.g., including the PMIC 206 and system loads powered by the PMIC 206; hereinafter, the load 206). As shown in the example of FIG. 2, the load 206 is coupled to the positive terminal of the first battery BAT1 (e.g., through the connection switch Qsys) and the second output terminal 254 of the charger circuit 212. The abovementioned two-battery-in-series charging mode, e.g., the 2S1P charging mode, includes a set of sub-modes. In a first sub-mode of the sub-modes, the controller 204 disables the charger circuit 212, and enables the charging path 258 to deliver the input power $P_{IN}$ to charge the batteries BAT1 and BAT2 via the first output terminal 262, and to power the load 206 via the positive terminal of the first battery BAT1. Examples of the current flows are illustrated in FIG. 7D.

In an embodiment, in a second sub-mode of the sub-modes of the two-battery-in-series charging mode, the controller 204 enables the charger circuit 212 and the charging path 258. The charger circuit 212 converts a first part of the input power $P_{IN}$ to regulated output power (e.g., including a current Ibuck shown in FIG. 7A) to power the load 206 via the second output terminal 254. The charging path 258 delivers a second part of the input power $P_{IN}$ to charge the batteries BAT1 and BAT2 via the first output terminal 262. Examples of the current flows are illustrated in FIG. 7A.

In an embodiment, in a third sub-mode of the sub-modes of the two-battery-in-series charging mode, the controller 204 enables the charger circuit 212 and the charging path 258. The charger circuit 212 converts a first part of the input power $P_{IN}$ to regulated output power (e.g., including a current Ibuck shown in FIG. 7B) to power the load 206 via the second output terminal 254. The charging path 258 delivers a second part of the input power $P_{IN}$ to charge the batteries BAT1 and BAT2 via the first output terminal 262 and to power the load 206 via the positive terminal of the first battery BAT1. Examples of the current flows are illustrated in FIG. 7B.

In an embodiment, in a fourth sub-mode of the sub-modes of the two-battery-in-series charging mode, the controller 204 enables the charger circuit 212 and the charging path 258. The charger circuit 212 converts a first part of the input power $P_{IN}$ to regulated output power (e.g., including a current Ibuck and a current Ibuck' shown in FIG. 7E) to power the load 206 and charge the first battery BAT1 via the second output terminal 254. The charging path 258 delivers a second part of the input power $P_{IN}$ to charge the batteries BAT1 and BAT2 via the first output terminal 262. Examples of the current flows are illustrated in FIG. 7E.

In an embodiment, the abovementioned one-battery charging mode (e.g., the 1S1P charging mode) includes a set of sub-modes. The sub-modes of the one-battery charging mode include a first-battery direct charging mode, a first-battery buck charging mode, and a second-battery direct charging mode. In the first-battery direct charging mode and the second-battery direct charging mode, the controller 204 disables the charger circuit 212 and enables the charging path 258. In the first-battery buck charging mode, the controller 204 disables the charging path 258 and enables the charger circuit 212.

More specifically, in an embodiment, in the first-battery direct charging mode, the switch control circuitry turns off the switches Q2 and Q0 and turns on the first switch Q1. The charging path 258 is enabled and delivers the input power $P_{IN}$, received at the connection interface 252, to charge the first battery BAT1 via the first switch Q1. In the second-battery direct charging mode, the switch control circuitry turns off the switches Q1 and Q0 and turns on the second switch Q2. The charging path 258 is enabled and delivers the input power $P_{IN}$ to charge the second battery BAT2 via the second switch Q2. As used herein, "charge the second battery BAT2 via the second switch Q2" means that the second switch Q2 is turned on and therefore provides a turned-on current path that allows a charging current to flow through the second battery BAT2. In the first-battery buck charging mode, the switch control circuitry turns off the switches Q1, Q2 and Q3. The charger circuit 212 is enabled and converts the input power $P_{IN}$ to regulated output power to charge the first battery BAT1 via the second output terminal 254.

In an embodiment, the portable device (e.g., 200, 400, 500A, or 500B) also includes a fourth switch Q4 coupled between the positive terminal of the second battery BAT2 and the second output terminal 254 of the charger circuit 212. The fourth switch Q4 is configured to control a connection between the positive terminal of the second battery BAT2 and the second output terminal 254. The portable device also includes a connection switch Qsys. The connection switch Qsys can be a switch included in the charger circuit 212, and can be used to protect the battery BAT1. For example, when the charger circuit 212 is charging the battery BAT1, if an abnormal condition such as an over-voltage, over-current, or over-temperature condition is present in the battery BAT1, then the connection switch Qsys is turned off. For another example, when the battery BAT1 is powering the load 206, if an over-discharge or under-voltage condition is present in the battery BAT1, then the connection switch Qsys is turned off. As shown in the example of FIG. 2, the connection switch Qsys is coupled between the positive terminal of the first battery BAT1 and the second output terminal 254, and is configured to control a connection between the positive terminal of the first battery BAT1 and the second output terminal 254. Additionally, the sub-modes of the one-battery charging mode include a second-battery buck charging mode. In the second-battery buck charging mode, the switch control circuitry turns off the connection switch Qsys and the switches Q1 and Q0, and turns on the switches Q2 and Q4. The controller 204 disables the charging path 258 and enables the charger circuit 212. The charger circuit 212 converts the input power $P_{IN}$ to regulated output power to charge the second battery BAT2 via the switches Q2 and Q4.

Additionally, in an embodiment, the abovementioned set of modes of the portable device (e.g., 200, 400, 500A, and 500B) includes a two-battery-in-parallel charging mode (e.g., an abovementioned 1S2P charging mode). In the two-battery-in-parallel charging mode, the switch control circuitry turns off the third switch Q0 and turns on the switches Q1 and Q2 such that the batteries BAT1 and BAT2 are, e.g., coupled in parallel, and charged by the input power $P_{IN}$.

Moreover, in an embodiment, the abovementioned set of modes of the portable device (e.g., 200, 400, 500A, and 500B) includes a balancing mode (e.g., similar to the abovementioned balancing mode). In the balancing mode, the switch control circuitry turns off the third switch Q0 and turns on the switches Q1 and Q2, and controls the switch Q1 or Q2 to adjust a charging current from one of the batteries BAT1 and BAT2 to the other one of the batteries BAT1 and BAT2, thereby balancing the batteries BAT1 and BAT2. For example, as shown in FIG. 3A, the current controller 230A controls the second switch Q2 to operate in a linear mode, and controls the charging current Ids2, e.g., a balancing current, from the first battery BAT1 to the second battery BAT2 by controlling the reference current Iref2 and/or the size ratio M between the switches Q2S and Q2. For another example, as shown in FIG. 3B, the current controller 230B controls the second switch Q2 to operate in a linear mode, and controls the charging current Ids2', e.g., a balancing current, from the second battery BAT2 to the first battery BAT1 by controlling the reference current Iref2' and/or the size ratio M' between the switches Q2D and Q2. For yet another example, as mentioned in relation to the example of FIG. 2, the CC1 controller 232 can control the first switch Q1 to operate in a linear mode, and controls a charging current Ids1 from the first battery BAT1 to the second battery BAT2.

In an embodiment, the switch control circuitry controls the switch, e.g., Q1 or Q2, such that the charging current (e.g., Ids2, Ids2', or Ids1) increases if a difference between a battery voltage $V_{BAT1}$ of the first battery BAT1 and a battery voltage $V_{BAT2}$ of the second battery BAT2 decreases, thereby speeding up the balance process and reducing the battery balance time.

Furthermore, in an embodiment, the abovementioned set of modes of the portable device (e.g., 200, 400, 500A, and 500B) includes a first-battery discharging mode. In the first-battery discharging mode, the switch control circuitry turns off the first and third switches Q1 and Q0. The charging path 258 and the charger circuit 212 are disabled, e.g., by the controller 204. The connection switch Qsys in the charger circuit 212 is turned on. Thus, the first battery BAT1 discharges to power the load 206 coupled to the positive terminal of the first battery BAT1 via the connection switch Qsys.

In an embodiment, as mentioned above, the portable device (e.g., 200, 400, 500A, and 500B) also includes a fourth switch Q4, coupled between the positive terminal of the second battery BAT2 and the load 206. The fourth switch Q4 is configured to control a connection between the positive terminal of the second battery BAT2 and the load 206. The connection switch Qsys is coupled between the positive terminal of the first battery BAT1 and the load 206, and is configured to control a connection between the positive terminal of the first battery BAT1 and the load 206. In addition, the abovementioned set of modes of the portable device (e.g., 200, 400, 500A, and 500B) includes a second-battery discharging mode. In the second-battery discharging mode, the switch control circuitry turns off the connection switch Qsys and the first and third switches Q1 and Q0, and turns on the second and fourth switches Q2 and Q4. The second battery BAT2 discharges to power the load 206 via the fourth switch Q4.

Furthermore, in an embodiment, the abovementioned set of modes of the portable device (e.g., 200, 400, 500A, and 500B) includes a two-battery discharging mode. The two-battery discharging mode includes a first sub-mode and a second sub-mode. In the first sub-mode, the switch control circuitry turns off the third switch Q0 and turns on the first and second switches Q1 and Q2. The connection switch Qsys is also turned on. Thus, the batteries BAT1 and BAT2 are, e.g., coupled in parallel, and discharge to power the load 206 via the first and second switches Q1 and Q2, and the connection switch Qsys. More specifically, a first supply current can flow from the first battery BAT1 to the load 206 through the connection switch Qsys, and a second supply current can flow from the second switch Q2, through the second battery BAT2 and the switches Q1 and Qsys, to the load 206. In the first sub-mode, the switch control circuitry controls the switch Q1 or Q2 to operate in a linear mode if a battery voltage $V_{BAT2}$ of the second battery BAT2 is greater than a battery voltage $V_{BAT1}$ of the first battery BAT1.

In an embodiment, in the second sub-mode of the two-battery discharging mode, the switch control circuitry turns off the switches Q1 and Q0, and turns on the connection switch Qsys and the switches Q2 and Q4. Thus, the batteries BAT11 and BAT2 are, e.g., coupled in parallel, and discharge to power the load 206 via the connection switch Qsys and the switches Q2 and Q4. In the second sub-mode, the switch control circuitry controls the second switch Q2 to operate in a linear mode if a battery voltage $V_{BAT2}$ of the second battery BAT2 is greater than a battery voltage $V_{BAT1}$ of the first battery BAT1.

In an embodiment, as shown in FIG. 2 or FIG. 4, the portable device 200 or 400 includes a sense resistor $R_{SEN}$ and a fuel gauge 210 coupled to the sense resistor $R_{SEN}$. A first end of the sense resistor $R_{SEN}$ is coupled to the negative terminal of the first battery BAT1, and a second end of the sense resistor $R_{SEN}$ is coupled to the reference terminal GNDP and to the negative terminal of the second battery BAT2 through the second switch Q2. The sense resistor $R_{SEN}$ is configured to sense a current, e.g., a charging current or a discharging current, flowing through the first battery BAT1. More specifically, the current (e.g., a charging current or a discharging current) of the battery BAT1 flows through the sense resistor $R_{SEN}$, and therefore a voltage across the sense resistor $R_{SEN}$ represents the current of the battery BAT1. The fuel gauge 210 can estimate a remaining capacity of the first battery BAT1 based on the sensed current (e.g., based on the voltage across the sense resistor $R_{SEN}$). If the batteries BAT1 and BAT2 are balanced, e.g., a voltage difference $V_{BAT1}-V_{BAT2}$ or $V_{BAT2}-V_{BAT1}$ is less than a balance threshold (e.g., the abovementioned preset reference ΔVt2), then the fuel gauge 210 can also estimate a remaining capacity of the second battery BAT2.

In another embodiment, as shown in FIG. 5A or FIG. 5B, a first end of the sense resistor $R_{SEN}$ is coupled to the negative terminal of the first battery BAT1 and is coupled to the negative terminal of the second battery BAT2 through the second switch Q2. A second end of the sense resistor $R_{SEN}$ is coupled to the reference terminal GNDP. The sense resistor $R_{SEN}$ is configured to sense a current flowing through a combination of the batteries BAT1 and BAT2. More specifically, in one such embodiment, a current (e.g., a charging current or a discharging current) of the first battery BAT1 can flow through the sense resistor $R_{SEN}$, a current (e.g., a charging current or a discharging current) of the second battery BAT2 can also flow through the sense resistor $R_{SEN}$. Thus, the sense resistor $R_{SEN}$ can be used to sense a current flowing through the combination of the batteries BAT1 and BAT2. The fuel gauge 210 can estimate a total remaining capacity of the batteries BAT1 and BAT2 based on the sensed current (e.g., based on a voltage across the sense resistor $R_{SEN}$). As to a balancing current Ibal that flows between the batteries BAT1 and BAT2, e.g., as mentioned in relation to FIG. 6A and FIG. 6B, the balancing current Ibal does not impact the estimation of the total remaining capacity.

Embodiments according to the present invention also provide battery management circuits (e.g., the circuit 440 in FIG. 4 and the circuit 540 in FIG. 5A) that manage the batteries BAT1 and BAT2 so that the batteries BAT1 and BAT2 can operate in a mode of the abovementioned set of modes (e.g., including a 2S1P charging mode, a 1S1P charging mode, a 1S2P charging mode, a 1S2P discharging mode, and a balancing mode).

In an embodiment, the battery management circuit (e.g., 440 or 540) includes a first switch Q1, a second switch Q2, a control terminal (e.g., the terminal 466 in FIG. 4 or the terminal 566 in FIG. 5A), and switch control circuitry that controls a set of switches including the switches Q1 and Q2. In some embodiments, the switch control circuitry can include an abovementioned controller 216, an abovementioned battery management circuitry 214, an abovementioned control logic circuit 434, or an abovementioned control logic circuit 534. In some other embodiments, the switch control circuitry can include a combined circuit of controllers 214 and 204, a combined circuit of the battery management circuitry 214 and the controller 204, a combined circuit of the control logic circuit 434 and the controller 204, or a combined circuit of the control logic circuit 534 and the controller 204.

The first switch Q1 has a first terminal coupled to the positive terminal of the first battery BAT1, e.g., via a terminal labeled "Vbat1p" in FIG. 4 or FIG. 5A. The first switch Q1 also has a second terminal coupled to the connection interface 250 (shown in FIG. 2 or FIG. 5B) via a terminal labeled "Vbat2p" and via the charging path 258. The second terminal of the first switch Q1 is also coupled to the positive terminal of the second battery BAT2, e.g., via the terminal Vbat2p. The first switch Q1 is configured to control a connection between the first and second terminals of the first switch Q1. The second switch Q2 has a third terminal coupled to the negative terminal of the second battery BAT2, e.g., via a terminal labeled "Vbat2n". The second switch Q2 also has a fourth terminal coupled to the negative terminal of the first battery BAT1 and coupled to a reference terminal GNDP, e.g., via a terminal labeled "GNDP2" and via a sense resistor $R_{SEN}$. The second switch Q2 is configured to control a connection between the third and fourth terminals of the second switch Q2. The control terminal (e.g., 466 or 566) is configured to control the third switch Q0 coupled between the positive terminal of the first battery BAT1 and the negative terminal of the second battery BAT2. The switch control circuitry (e.g., 434 or 534) can control the switches Q1, Q2 and Q0 such that the batteries BAT1 and BAT2 selectively operate in a mode of the abovementioned set of modes. The set of modes include at least a one-battery charging mode (e.g., an abovementioned 1S1P charging mode) and a two-battery-in-series charging mode (e.g., an abovementioned 2S1P charging mode).

In the one-battery charging mode, the switch control circuitry (e.g., 434 or 534) turns off the third switch Q0, and controls the switches Q1 and Q2 such that a battery of the batteries BAT1 and BAT2 is charged by the input power $P_{IN}$ received at the connection interface 252. In the two-battery-in-series charging mode, the switch control circuitry turns off the switches Q1 and Q2, and turns on the third switch Q0 such that the batteries BAT1 and BAT2 are, e.g., coupled in series, and charged by the input power $P_{IN}$.

Figure 8:
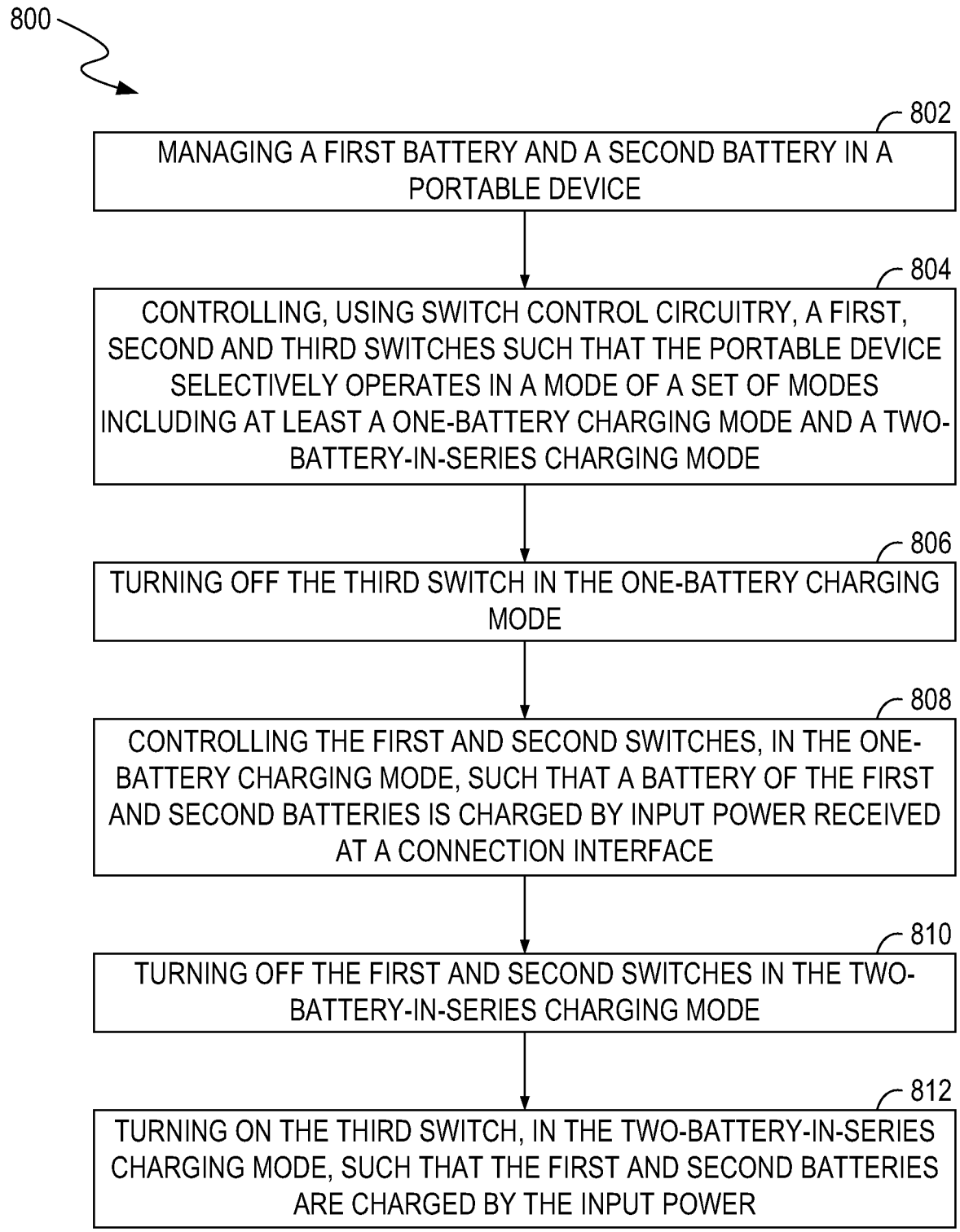
FIG. 8 illustrates a flowchart of an example of a method for managing a first battery and a second battery in a portable device, in an embodiment of the present invention.

FIG. 8 illustrates a flowchart 800 of an example of a method for managing a first battery and a second battery in a portable device, in an embodiment of the present invention. FIG. 8 is described in combination with FIG. 2, FIG. 3A, FIG. 3B, FIG. 4, FIG. 5A, FIG. 5B, FIG. 6A, FIG. 6B, FIG. 7A, FIG. 7B, FIG. 7C, FIG. 7D and FIG. 7E.

At step 802, a battery management circuit (e.g., 440 or 540) manages a first battery BAT1 and a second battery BAT1 in a portable device (e.g., 200, 400, 500A or 500B). The first battery BAT1 has a positive terminal coupled to the connection interface 250 through a first switch Q1 and a DFC (direct-fast-charge) path 258 (e.g., including a charging switch Q3A and a discharging switch Q3B). The first battery BAT1 also has a negative terminal coupled to a reference terminal, e.g., a ground terminal GNDP of the portable device. The second battery BAT2 has a positive terminal coupled to the connection interface 250 via the DFC charging path 258, and has a negative terminal coupled to the reference terminal GNDP through a second switch Q2 and coupled to the positive terminal of the first battery BAT1 through a third switch Q0.

At step 804, switch control circuitry controls the switches Q1, Q2 and Q3 such that the portable device selectively operates in a mode of a set of modes including at least a one-battery charging mode (e.g., an abovementioned 1S1P charging mode) and a two-battery-in-series charging mode (e.g., an abovementioned 2S1P charging mode). In some embodiments, the switch control circuitry can include an abovementioned controller 216, an abovementioned battery management circuitry 214, an abovementioned control logic circuit 434, or an abovementioned control logic circuit 534. In some other embodiments, the switch control circuitry can include a combined circuit of controllers 214 and 204, a combined circuit of the battery management circuitry 214 and the controller 204, a combined circuit of the control logic circuit 434 and the controller 204, or a combined circuit of the control logic circuit 534 and the controller 204.

At step 806, the switch control circuitry turns off the third switch Q0 in the one-battery charging mode.

At step 808, the switch control circuitry also controls the switches Q1 and Q2, in the one-battery charging mode, such that a battery of the batteries BAT1 and BAT2 is charged by input power $P_{IN}$ received at the connection interface 250.

At step 810, the switch control circuitry turns off the switches Q1 and Q2 in the two-battery-in-series charging mode.

At step 812, the switch control also turns on the third switch Q0, in the two-battery-in-series charging mode, such that the batteries BAT1 and BAT2 are charged by the input power $P_{IN}$.

In summary, embodiments according to the present invention provide portable devices that permit flexible arrangement of batteries. More specifically, the portable device can include a first battery (e.g., including one or more battery cells) and a second battery (e.g., including one or more battery cells), a set of switches coupled to the first and second batteries, and a switch control circuit that controls the switches. As a result, the first and second batteries can be coupled in series or in parallel, or can operate individually. The arrangement of the first and second batteries can be relatively flexible and can be used in multiple different applications. For example, the portable device can be a foldable device such as a foldable smartphone. The phone includes a foldable display panel. When the phone is folded, one half of the display panels is active (e.g., turned on), and the other half of the display panels is inactive (e.g., turned off). In this type of operation, the phone can be powered by the first battery or the second battery, or powered by the first and second batteries coupled in parallel. When the phone is unfolded, the whole display panel is active (e.g., turned on). In this type of operation, the phone can be powered by the first and second batteries coupled in series. These are only examples of the types of applications in which the present invention can be used. Whether the first and second batteries are coupled in series, or in parallel, or operate individually, depends on the practical situations and operation requirements of the portable device.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

I claim:

1. A portable device, comprising:
a connection interface that connects said portable device to a power source to receive input power;
a first battery having a positive terminal electrically coupled to said connection interface through a first switch, and having a negative terminal electrically coupled to a reference terminal;
a second battery having a positive terminal electrically coupled to said connection interface, and having a negative terminal electrically coupled to said reference terminal through a second switch and electrically coupled to said positive terminal of said first battery through a third switch;
switch control circuitry, electrically coupled to said first, second and third switches, and configured to control said first, second and third switches such that said portable device selectively operates in a mode of a plurality of modes comprising at least a balancing mode, a one-battery charging mode, and a two-battery-in-series charging mode;
a charging path comprising a first input terminal electrically coupled to said connection interface, comprising a first output terminal electrically coupled to said positive terminal of said second battery and electrically coupled to said positive terminal of said first battery through said first switch, and configured to deliver at least a part of said input power from said first input terminal to said first output terminal, wherein said one-battery charging mode comprises a first-battery direct charging mode, and in said first-battery direct charging mode, said charging path is enabled such that said first output terminal of said charging path provides said at least a part of said input power to said first battery through said first switch;
a charger circuit comprising a second input terminal electrically coupled to said connection interface, comprising a second output terminal electrically coupled to said positive terminal of said first battery and electrically coupled to said positive terminal of said second battery through said first switch, and configured to convert at least a part of said input power at said second input terminal to regulated power at said second output terminal; and
a controller, electrically coupled to said charging path and said charger circuit, that selectively enables at least one of said charging path and said charger circuit,
wherein in said one-battery charging mode, said switch control circuitry turns off said third switch, and controls said first and second switches such that a battery of said first and second batteries is charged by said input power,
wherein in said two-battery-in-series charging mode, said switch control circuitry turns off said first and second switches, and turns on said third switch such that said first and second batteries are charged by said input power,
wherein in said balancing mode, said switch control circuitry turns off said third switch and turns on said first and second switches, and controls a switch of said first and second switches to operate in a linear mode to adjust a charging current from one of said first and second batteries to the other one of said first and second batteries to a target reference, thereby balancing said first and second batteries,
and wherein in said balancing mode, said switch control circuitry controls said switch of said first and second switches such that said charging current increases if a difference between a battery voltage of said first battery and a battery voltage of said second battery decreases.

2. The portable device of claim 1, further comprising:
a load electrically coupled to said positive terminal of said first battery and said second output terminal of said charger circuit,
wherein said two-battery-in-series charging mode comprises a plurality of sub-modes, wherein in a first sub-mode of said sub-modes, said controller disables said charger circuit, and enables said charging path to deliver said input power to charge said first and second batteries via said first output terminal, and to power said load via said positive terminal of said first battery.

3. The portable device of claim 2, wherein in a second sub-mode of said sub-modes, said controller enables said charger circuit and said charging path, said charger circuit converts a first part of said input power to regulated output power to power said load via said second output terminal, and said charging path delivers a second part of said input power to charge said first and second batteries via said first output terminal.

4. The portable device of claim 2, wherein in a second sub-mode of said sub-modes, said controller enables said charger circuit and said charging path, said charger circuit converts a first part of said input power to regulated output power to power said load via said second output terminal, and said charging path delivers a second part of said input power to charge said first and second batteries via said first output terminal and to power said load via said positive terminal of said first battery.

5. The portable device of claim 2, wherein in a second sub-mode of said sub-modes, said controller enables said charger circuit and said charging path, said charger circuit converts a first part of said input power to regulated output power to power said load and charge said first battery via said second output terminal, and said charging path delivers a second part of said input power to charge said first and second batteries via said first output terminal.

6. The portable device of claim 1, wherein said one-battery charging mode comprises a plurality of sub-modes and said sub-modes comprise at least one of said first-battery direct charging mode, a first-battery buck charging mode, and a second-battery direct charging mode, wherein in said first-battery direct charging mode and said second-battery direct charging mode, said controller disables said charger circuit and enables said charging path, and wherein in said first-battery buck charging mode, said controller disables said charging path and enables said charger circuit.

7. The portable device of claim 6, wherein in said first-battery direct charging mode, said switch control circuitry turns off said second and third switches and turns on said first switch, and said charging path delivers said input power to charge said first battery via said first switch,
wherein in said second-battery direct charging mode, said switch control circuitry turns off said first and third switches and turns on said second switch, and said charging path delivers said input power to charge said second battery via said second switch,
and wherein in said first-battery buck charging mode, said switch control circuitry turns off said first, second, and third switches, and said charger circuit converts said input power to regulated output power to charge said first battery via said second output terminal.

8. The portable device of claim 6, further comprising:
a fourth switch, coupled between said positive terminal of said second battery and said second output terminal of said charger circuit, and configured to control a connection between said positive terminal of said second battery and said second output terminal; and
a connection switch coupled between said positive terminal of said first battery and said second output terminal, and configured to control a connection between said positive terminal of said first battery and said second output terminal,
wherein said sub-modes further comprise a second-battery buck charging mode, wherein in said second-battery buck charging mode, said switch control circuitry turns off said connection switch and said first and third switches and turns on said second and fourth switches, and said charger circuit converts said input power to regulated output power to charge said second battery via said second and fourth switches.

9. The portable device of claim 1, wherein said plurality of modes further comprises a two-battery-in-parallel charging mode, wherein in said two-battery-in-parallel charging mode, said switch control circuitry turns off said third switch and turns on said first and second switches such that said first and second batteries are charged by said input power.

10. The portable device of claim 1, wherein said plurality of modes further comprises a first-battery discharging mode, wherein in said first-battery discharging mode, said switch control circuitry turns off said first and third switches, and said first battery discharges to power a load coupled to said positive terminal of said first battery.

11. The portable device of claim 10, further comprising:
a fourth switch, coupled between said positive terminal of said second battery and said load, and configured to control a connection between said positive terminal of said second battery and said load; and
a connection switch, coupled between said positive terminal of said first battery and said load, and configured to control a connection between said positive terminal of said first battery and said load,
wherein said plurality of modes further comprises a second-battery discharging mode, and wherein in said second-battery discharging mode, said switch control circuitry turns off said connection switch and said first and third switches and turns on said second and fourth switches, and said second battery discharges to power said load via said fourth switch.

12. The portable device of claim 1, wherein said plurality of modes further comprises a two-battery discharging mode comprising a first sub-mode, wherein in said first sub-mode, said switch control circuitry turns off said third switch and turns on said first and second switches, said first and second batteries discharge to power, via said first and second switches, a load coupled to said positive terminal of said first battery, and said switch control circuitry controls a switch of said first and second switches to operate in a linear mode if a battery voltage of said second battery is greater than a battery voltage of said first battery.

13. The portable device of claim 12, further comprising:
a fourth switch, coupled between said positive terminal of said second battery and said load, and configured to control a connection between said positive terminal of said second battery and said load; and
a connection switch, coupled between said positive terminal of said first battery and said load, and configured to control a connection between said positive terminal of said first battery and said load,
wherein said two-battery discharging mode further comprises a second sub-mode, and wherein in said second sub-mode, said switch control circuitry turns off said first and third switches and turns on said connection switch and said second and fourth switches, said first and second batteries discharge to power said load via said connection switch and said second and fourth switches, and said switch control circuitry controls said second switch to operate in a linear mode if a battery voltage of said second battery is greater than a battery voltage of said first battery.

14. The portable device of claim 1, further comprising:
a sense resistor having a first end coupled to said negative terminal of said first battery, and having a second end coupled to said reference terminal and coupled to said negative terminal of said second battery through said second switch, and configured to sense a current flowing through said first battery; and
a fuel gauge, coupled to said sense resistor, configured to estimate a remaining capacity of said first battery based on the sensed current, and configured to estimate a remaining capacity of said second battery if said first and second batteries are balanced.

15. The portable device of claim 1, further comprising:
a sense resistor having a first end electrically coupled to said negative terminal of said first battery, said first end also electrically coupled to said negative terminal of said second battery through said second switch, said sense resistor also having a second end electrically coupled to said reference terminal, wherein said sense resistor is configured to sense a current flowing through a combination of said first and second batteries, and wherein said negative terminal of said second battery is electrically coupled to said reference terminal through said second switch and said sense resistor; and
a fuel gauge, electrically coupled to said sense resistor, configured to estimate a total remaining capacity of said first and second batteries based on the sensed current.

16. The portable device of claim 1, wherein in said balancing mode, if a battery voltage of said first battery is greater than a battery voltage of said second battery, then said switch control circuitry controls said second switch to operate in said linear mode thereby adjusting said charging current to said target reference.

17. The portable device of claim 16, wherein in said balancing mode, if said battery voltage of said second battery is greater than said battery voltage of said first battery, then said switch control circuitry controls a voltage across a body diode of said second switch to be less than a threshold voltage of said body diode, and controls said second switch to operate in said linear mode thereby adjusting a discharging current flowing from said second battery to said first battery.

18. The portable device of claim 1, wherein in said balancing mode, if a battery voltage of said second battery is greater than a battery voltage of said first battery, then said switch control circuitry controls said first switch to operate in said linear mode thereby adjusting said charging current to said target reference.

19. A battery management circuit, comprising:
a first switch comprising a first terminal electrically coupled to a positive terminal of a first battery, comprising a second terminal electrically coupled to a connection interface and electrically coupled to a positive terminal of a second battery, and configured to control a connection between said first and second terminals;
a second switch comprising a third terminal electrically coupled to a negative terminal of said second battery, comprising a fourth terminal electrically coupled to a negative terminal of said first battery and electrically coupled to a reference terminal, and configured to control a connection between said third and fourth terminals;
a control terminal configured to control a third switch coupled between said positive terminal of said first battery and said negative terminal of said second battery;
switch control circuitry, electrically coupled to said first and second switches and said control terminal, and configured to control said first, second and third switches such that said first and second batteries selectively operate in a mode of a plurality of modes comprising at least a balancing mode, a one-battery charging mode, and a two-battery-in-series charging mode;
a charging path comprising a first input terminal electrically coupled to said connection interface, comprising a first output terminal electrically coupled to said positive terminal of said second battery and electrically coupled to said positive terminal of said first battery through said first switch, and configured to deliver at least a part of said input power from said first input terminal to said first output terminal, wherein said one-battery charging mode comprises a first-battery direct charging mode, and in said first-battery direct charging mode, said charging path is enabled such that said first output terminal of said charging path provides said at least a part of said input power to said first battery through said first switch;
a charger circuit comprising a second input terminal electrically coupled to said connection interface, comprising a second output terminal electrically coupled to said positive terminal of said first battery and electrically coupled to said positive terminal of said second battery through said first switch, and configured to convert at least a part of said input power at said second input terminal to regulated power at said second output terminal; and a controller, electrically coupled to said charging path and said charger circuit, that selectively enables at least one of said charging path and said charger circuit,
wherein in said one-battery charging mode, said switch control circuitry turns off said third switch, and controls said first and second switches such that a battery of said first and second batteries is charged by input power received at said connection interface,
wherein in said two-battery-in-series charging mode, said switch control circuitry turns off said first and second switches, and turns on said third switch such that said first and second batteries are charged by said input power,
wherein in said balancing mode, said switch control circuitry turns off said third switch and turns on said first and second switches, and controls a switch of said first and second switches to operate in a linear mode to adjust a charging current from one of said first and second batteries to the other one of said first and second batteries to a target reference, thereby balancing said first and second batteries,
and wherein in said balancing mode, said switch control circuitry controls said switch of said first and second switches such that said charging current increases if a difference between a battery voltage of said first battery and a battery voltage of said second battery decreases.

20. A method comprising:
managing a first battery and a second battery in a portable device, wherein said first battery comprises a positive terminal electrically coupled to a connection interface through a first switch, and comprises a negative terminal electrically coupled to a reference terminal, wherein said second battery comprises a positive terminal electrically coupled to said connection interface, and comprises a negative terminal electrically coupled to said reference terminal through a second switch and electrically coupled to said positive terminal of said first battery through a third switch, wherein said managing comprises:
controlling, using switch control circuitry, said first, second and third switches such that said portable device selectively operates in a mode of a plurality of modes comprising at least a balancing mode, a one-battery charging mode and a two-battery-in-series charging mode;
turning off said third switch in said one-battery charging mode;
controlling said first and second switches, in said one-battery charging mode, such that a battery of said first and second batteries is charged by input power received at said connection interface, wherein said one-battery charging mode comprises a first-battery direct charging mode;
turning off said first and second switches in said two-battery-in-series charging mode;
turning on said third switch, in said two-battery-in-series charging mode, such that said first and second batteries are charged by said input power;
delivering, using a charging path, at least a part of said input power from a first input terminal of said charging path to a first output terminal of said charging path if said charging path is enabled, wherein said first input terminal is electrically coupled to said connection interface, and said first output terminal is electrically coupled to said positive terminal of said second battery and electrically coupled to said positive terminal of said first battery through said first switch;

enabling said charging path in said first-battery direct charging mode;

providing, using said first output terminal of said charging path, said at least a part of said input power to said first battery through said first switch in said first-battery direct charging mode;

converting, using a charger circuit, at least a part of said input power at a second input terminal of said charger circuit to regulated power at a second output terminal of said charger circuit if said charger circuit is enabled, wherein said second input terminal is electrically coupled to said connection interface, and said second output terminal is electrically coupled to said positive terminal of said first battery and electrically coupled to said positive terminal of said second battery through said first switch; and selectively enabling at least one of said charging path and said charger circuit, and wherein said managing further comprises performing a plurality of operations in said balancing mode, said plurality of operations comprising:

turning off said third switch;

turning on said first and second switches;

balancing said first and second batteries by controlling a switch of said first and second switches to operate in a linear mode to adjust a charging current from one of said first and second batteries to the other one of said first and second batteries to a target reference; and controlling said switch of said first and second switches such that said charging current increases if a difference between a battery voltage of said first battery and a battery voltage of said second battery decreases.

* * * * *